(12) United States Patent
Larson

(10) Patent No.: US 11,165,848 B1
(45) Date of Patent: Nov. 2, 2021

(54) EVALUATING QUALITATIVE STREAMING EXPERIENCE USING SESSION PERFORMANCE METADATA

(71) Applicant: NVIDIA Corporation, Santa Clara, CA (US)

(72) Inventor: Alan Daniel Larson, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/000,155

(22) Filed: Aug. 21, 2020

(51) Int. Cl.
*H04L 29/06* (2006.01)
*H04N 21/24* (2011.01)

(52) U.S. Cl.
CPC .......... *H04L 65/80* (2013.01); *H04L 65/607* (2013.01); *H04N 21/2401* (2013.01)

(58) Field of Classification Search
CPC .... H04L 65/80; H04L 65/607; H04N 21/2401
See application file for complete search history.

(56) References Cited

U.S. PATENT DOCUMENTS

| 10,200,428 | B1* | 2/2019 | Rosenzweig | ....... H04L 41/0806 |
| 2012/0321273 | A1* | 12/2012 | Messmer | ............. H04N 13/128 386/224 |
| 2013/0166766 | A1* | 6/2013 | Nahrstedt | .......... H04N 21/2393 709/231 |
| 2013/0318252 | A1* | 11/2013 | Bulava | ............... H04N 21/4335 709/231 |
| 2013/0318253 | A1* | 11/2013 | Kordasiewicz | ....... H04L 65/605 709/231 |
| 2014/0080428 | A1* | 3/2014 | Rhoads | ............... G06F 16/5838 455/88 |
| 2015/0026309 | A1* | 1/2015 | Radcliffe | ................ H04L 69/14 709/219 |

* cited by examiner

Primary Examiner — Benjamin M Thieu
(74) Attorney, Agent, or Firm — Leydig, Voit & Mayer, Ltd.

(57) ABSTRACT

A technique for evaluating qualitative streaming experience using session performance metadata is disclosed herein. A pipeline of a streaming service can be adapted to collect metadata, such as timestamps, from various components of the pipeline. The metadata can then be analyzed to calculate an objective quality metric for each streaming session using weighted scores derived from the metadata for a plurality of different components including, but not limited to, stutter, latency, and/or picture quality. The quality metric is designed to have high correlation with subjective measures of quality by users of the streaming service, but provides dense data samples compared to typical sparse responses collected from user feedback (e.g., user surveys). The objective quality metric can be utilized to quickly adjust, either manually or automatically, the streaming service parameters to improve the quality of the streaming service due to changes in, e.g., streaming content.

20 Claims, 16 Drawing Sheets

EVALUATING QUALITATIVE STREAMING EXPERIENCE USING SESSION PERFORMANCE METADATA

TECHNICAL FIELD

The present disclosure relates to data analytics. More specifically, the embodiments set forth below describe techniques for estimating a qualitative measure of a streaming experience associated with a streaming session based on performance metadata captured by a pipeline.

BACKGROUND

Cloud-based services have been developed for a variety of applications such as network storage, virtual compute resources, and the like. Popular video-on-demand (VOD) streaming services provide a service that delivers video to a client device such as a television or tablet computer. Streaming video offers certain challenges that require a minimum quality of service (QoS) to ensure a sufficient user experience. For example, low network bandwidth or high network congestion can cause video to be delayed, leading to repeated buffering of the video at the client side that prevents a seamless viewing experience.

New cloud-based services are being developed for streaming video games and/or virtual reality/augmented reality graphics to client devices over a network. These applications receive feedback (e.g., controller feedback, inertial feedback, or the like) from the client side to function. Frames for display of the graphical output on a display device or head-mounted display (HMD) can be rendered on a server and transmitted to a client device over the network for display. Feedback from the client device is transmitted to the server device via the network. The feedback signals are used by the server device to adjust the subsequent frames delivered to the client device.

Administrators of these cloud-based services are constantly striving to improve the experience for their users. Network congestion, configuration of a rendering pipeline, encoding or decoding of images, and the like can all contribute to latency issues that are perceptible to a user. For example, a long delay (also known as "lag") between input of a controller at the client device and viewing a response to that input on a display of the client device can degrade the experience of a user. The delay can be caused by network congestion from the client to the server, a long latency of the rendering pipeline, a long encoding procedure, network congestion from the server to the client, or a long decoding procedure.

However, defining and measuring the quality of a streaming session for a user can be difficult. Different users can have very different perceptions of the same experience. For example, users that have higher performing client devices might perceive the experience to be worse than users that have lower performing client devices, simply because the users with higher performing devices might expect a better quality of the displayed images due to the hardware that is utilized by the client device. Similarly, users in different regions of the world may have different expectations simply based on common infrastructure available in their region.

One common method for estimating the quality of a streaming session is to solicit user feedback at the end of a session. For example, the client device can prompt the user to enter a rating (e.g., a star rating of 1 to 5 stars) that indicates the user's subjective level of satisfaction with the streaming session. However, there are issues with collecting subjective feedback in this manner. First, the feedback may be sparsely collected (e.g., every week or every 10 sessions, etc.) such that the user does not become annoyed at a recurring prompt for feedback. Second, the subjective feedback provided by a user may not be the most accurate. Some users may simply select 5 stars regardless of their experience to quickly dismiss the prompt for feedback. As another example, even if a particular user has a poor experience due to, e.g., network congestion, that user may still rate the session highly if the user has poor Internet connectivity in their location and are accustomed to poor network performance.

There is a desire to develop an objective measure of a quality of a streaming session that is highly correlated to the subjective measure of quality provided from sparse user feedback. The objective measurement could be densely populated (e.g., provided for each and every streaming session), and remove biases from individual end users, which can vary significantly from user to user. Therefore, new techniques or approaches for estimating consumer satisfaction with a pipeline for a streaming service are needed.

SUMMARY

A method, computer readable medium, and system are disclosed for evaluating qualitative streaming experience using session performance metadata. A pipeline of a streaming service can be adapted to collect metadata, such as timestamps, from various components of the pipeline. The metadata can then be analyzed to calculate a quality metric for each streaming session using weighted scores derived from the metadata for a plurality of different components including, but not limited to, stutter, latency, and/or picture quality.

In a first aspect of the present disclosure, a system is described for estimating a quality of a streaming session provided by a streaming service. The system includes one or more processors configured to: receive metadata for a plurality of frames included in the streaming session; calculate, for each frame of the plurality of frames, a score and a weight for each component of a plurality of components derived from the metadata; calculate a quality metric for the streaming session based on the scores and weights for the plurality of components; and adjust at least one component of a pipeline implemented by the streaming service based on the quality metric.

In some embodiments, the quality metric is calculated as a sum of a picture quality score and a combined stutter-latency score. The combined stutter-latency score can be calculated by calculating, for each frame of the plurality of frames, a rolling weighted score for each component of at least one latency component and at least one stutter component based on a first sliding window, and calculating a rolling mean of a combined weighted sum of the rolling weighted scores for each of the at least one latency component and at least one stutter component. The rolling mean of the combined weighted sum is based on a second sliding window.

In some embodiments, the combined stutter-latency score is calculated as a difference between an aggregate weighted mean calculated based on a first set of parameters and a standard deviation based on a second set of parameters.

In some embodiments, the picture quality score is calculated as a difference between a mean of a plurality of picture quality scores for the plurality of frames and a product of a coefficient and a standard deviation of the plurality of picture quality scores for the plurality of frames.

In some embodiments, adjusting the at least one component of the pipeline implemented by the streaming service based on the quality metric includes adjusting at least one of a quantization parameter, a target bit rate, and encoding parameter, or a target resolution for the frames generated by the pipeline.

In some embodiments, the one or more processors are further configured to generate a visual representation of the quality metric for the streaming session.

In some embodiments, the plurality of components include at least one of the following components: a first stutter component based on a delta between a first timestamp corresponding to rendering a frame by an application and a second timestamp corresponding to capturing the frame by a first stage of the pipeline; a second stutter component based on a delta between a first timestamp corresponding to presenting the frame on a client device and a second timestamp corresponding to presenting a previous frame on the client device; a first latency component based on a round trip delay for the frame; and/or a second latency component based on a stack latency for the frame.

In a second aspect of the present disclosure, a method is described for estimating a quality metric of a streaming session. The method includes the steps of: receiving metadata for a plurality of frames included in the streaming session, calculating, for each frame of the plurality of frames, a score and a weight for each component of a plurality of components derived from the metadata, and calculating a quality metric for the streaming session based on the scores and weights for the plurality of components. The metadata includes information related to a number of stages in a pipeline implemented by a streaming service, and the pipeline includes at least one stage implemented by a server device and at least one additional stage implemented by a client device connected to the server device via a network.

In some embodiments, the method further includes the step of generating a visual representation of the quality metric for one or more streaming sessions. Alternatively, the method includes the step of adjusting at least one component of the pipeline based on the quality metric.

In a third aspect of the present disclosure, a non-transitory computer-readable media storing computer instructions that, when executed by one or more processors, cause the one or more processors to perform the method of the second aspect.

It will be appreciated that features or embodiments of one aspect can be combined with features of embodiments of another aspect of the present disclosure.

DETAILED DESCRIPTION

Figure 1:
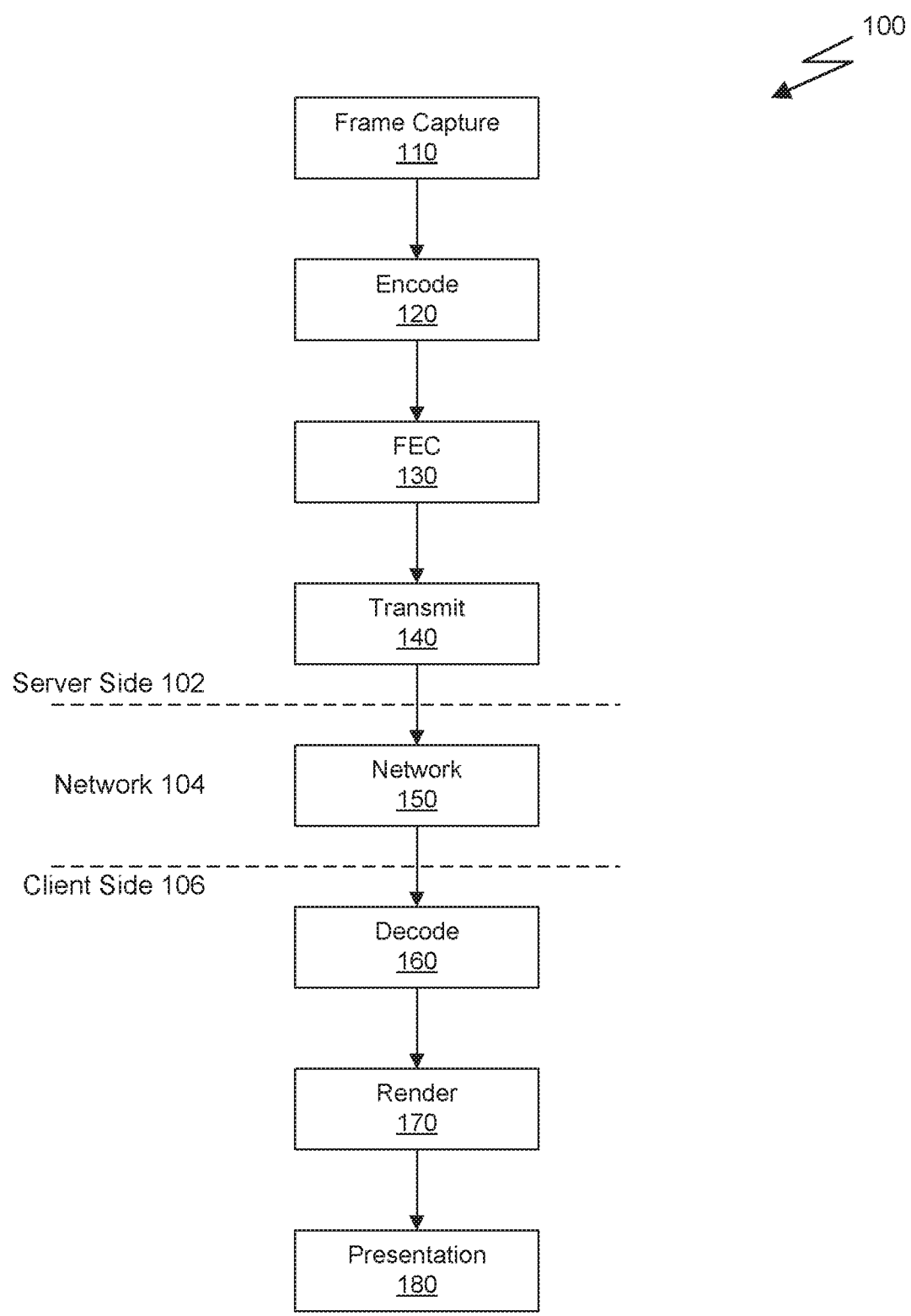
FIG. 1 illustrates a pipelined stack for a cloud-based service, in accordance with some embodiments.

A pipeline for a cloud-based service is configured to track the progress of content being processed by the pipeline by updating metadata corresponding to the content. Each stage of the pipeline implemented by a server device can insert a timestamp into the metadata when processing of the content is completed by the stage. The client device, upon receiving the content and metadata, can update the metadata for any additional stages of the pipeline that are implemented by the client device and then transmit the updated metadata back to the server device.

The server device can analyze the metadata for a streaming session in order to calculate an objective quality metric for the streaming session. It will be appreciated that conventional methods of characterizing a streaming session are somewhat unreliable or obtrusive to the end-user and, therefore, a new method for calculating a quality metric, objectively based on the metadata collected for a streaming session by the pipeline, is needed. The technique for calculating the quality metric disclosed herein is based on various components of the metadata that were selected in order to correlate the objective quality metric with subjective quality scores provided by a number of end-users, as determined through statistical analyses of multiple configurations or sets of different components. The resulting objective quality metric has good correlation with the subjective quality metric provided by end-users, but does not require any feedback from the end-users as all of the input variables for the quality metric can be derived from the metadata that is collected automatically by the pipeline.

Use of this objective quality metric can help administrators or designers of a cloud-based service, such as a game streaming platform, adjust the components of the pipeline to improve the experience of all users of the service. For example, a game streaming pipeline can be configured to deliver video corresponding to more than one type of gaming application. When a new game is added to the streaming service, then the pipeline might need to be adjusted to match the characteristics of the new game. The pipeline can be adjusted to reduce latency by changing the frame rate or the quantization parameters of the encoding stage of the pipeline in order to improve the experience and account for the increased rendering time of the new gaming application. Without any feedback, the administrators can have a difficult time determining what parameters should be adjusted, and whether the new gaming application is performing better than or worse than previous gaming applications. The information provided by a quality metric such as that described below and based on objective data collected by the streaming service on both the server side and the client side can vastly improve the user experience of the platform. In some cases, the quality metric can also be used to automatically adjust the parameters of the pipeline to improve the functioning thereof, thereby reducing the burden of network administrators.

FIG. 1 illustrates a pipelined stack 100 for a cloud-based service, in accordance with some embodiments. The cloud-based service is implemented as a pipelined stack 100 of a plurality of stages. Each stage includes one or more components, and the output of one stage is received at the input of a subsequent stage, with the exception of the last stage. As depicted in FIG. 1, a pipelined stack 100 for a cloud-based, game streaming service includes a number of stages. The server side 102 implements a number of stages on one or more server devices, the stages including a frame capture stage 110, an encoding stage 120, a forward error correction (FEC) stage 130, and a transmit stage 140. The pipelined stack 100 also includes a network stage 150 that encompasses the transmission of data packets over a network 104 from the server side 102 to the client side 106. The network stage 150 is performed on one or more network devices, such as network routers, switches, access points, or the like. The client side 106 implements a number of stages on one or more client devices, the stages including a decoding stage 160, a render stage 170, and a presentation stage 180.

It will be appreciated that the exemplary pipelined stack 100 for a game streaming service is depicted in FIG. 1 for purposes of illustration of the various techniques described herein. In other embodiments, the particular arrangement of stages in the pipelined stack 100 can be different, such as by including additional stages not shown in FIG. 1 or omitting stages that are shown in FIG. 1. For example, the FEC stage 130 may be omitted where FEC is not implemented by the service. In addition, some implementations may combine aspects of two or more stages into a single stage (e.g., FEC and transmit may be combined into a single stage of the pipelined stack 100).

In addition, although not shown explicitly in FIG. 1, the initial stage of the pipelined stack 100, the frame capture stage 100, interacts with one or more applications, such as a gaming application, which generate frames of video to be streamed to the client device. The game application 100 can receive input from a client device and render each subsequent frame of video based on the input. The frames of video can be stored in a memory that is accessible to the frame capture stage 100, which monitors the memory or receives a signal from the gaming application whenever a new frame of video is ready to be streamed to the client. It will be appreciated that, in some embodiments, the first stage of the pipelined stack 100 can be adapted to include the gaming application, which repeatedly generates new frames that are transmitted to the second encoding stage 120 of the pipelined stack 100.

Each stage shown in FIG. 1 can include one or more components. For example, the encoding stage 120 can include a queue component that asynchronously receives frames from the frame capture stage 110 while a previous frame is being encoded by an encoder component. The encoding stage 120 can also include a send queue component that asynchronously receives encoded frames from the encoder component and transmits the encoded frames to the FEC stage 130 when the encoded frames are available and the FEC stage 130 is ready. As will be discussed in more detail, metadata for the content processed by the stages of the pipelined stack 100 can be updated by each stage or, alternatively, by each component within the stage such that multiple timestamps are appended to the metadata by at least one stage of the pipelined stack 100.

In an embodiment, the content includes one or more frames of rendered video and metadata is generated for each frame. As used herein, a frame can refer to a data structure that encodes image data for display on a display device. The frame can include an array of pixel values, where each pixel value includes one or more channels of color information. For example, the pixel values can include a red channel, a blue channel, and a green channel that indicates, via 8 or 10 bits, for example, a color of the pixel. Of course, in other embodiments, the pixel values can be encoded in a different format such as by encoding luminance and chrominance information in separate channels. In some embodiments, each component or stage of the pipelined stack 100 can be configured to update metadata corresponding to the processed frame by adding a timestamp to the metadata when that stage/component has finished processing the frame. The metadata is then forwarded to the next component/stage along with the processed content. Furthermore, it will be appreciated that transmitting a frame of video to the client device can refer to transmitting one or more data packets to the client device, where the frame data can be included in the payload of the one or more data packets.

In the context of a gaming application executed by a cloud-based service, where rendered frames of the game are delivered to a client device via a network, the metadata for each frame can include timestamps that indicate: when a frame was rendered by the gaming application on the server device, when the frame was captured via the frame capture stage 110 (e.g., loaded from a memory used by the gaming application), when encoding of the frame is complete via the encoding stage 120, when the frame is transmitted over the network via a network interface of the server device in the transmit stage 140, when the client device receives the frame via the network stage 150, when the client device has decoded the frame via the decoding stage 160, when the decoded frame is processed to generate an image for display on the client device via the render stage 170, or when the image is presented on the display device 180, among others. In some cases, the metadata can include other timestamps for each frame, such as a timestamp associated with input (e.g., keypress information, mouse event information, or controller information, etc.) from the client side 106 that was used to render the frame by the gaming application at the server side 102 prior to frame processing by the pipelined stack 100. Each of these timestamps for a frame can be combined with corresponding timestamps of other frames (e.g., a previous frame or a subsequent frame) in order to generate delta values that represent raw values for various components of a quality metric. As used herein, a delta value refers to a difference between two timestamps. In some cases, a delta value can be shifted based on an expected time between two subsequent frames based on a target frame rate. Thus, the delta value can be negative if the difference between two timestamps is less than the expected time between frames and the delta value can be positive if the difference between two timestamps is more than the expected time between frames. An expected time between frames refers to an average time that each frame is displayed given a target frame rate. For example, with a frame rate of 60 Hz, an expected time between frames is approximately 16.6 ms.

At the end of the pipelined stack 100, the client device transmits the metadata back to the server device for storage and/or analysis. In an embodiment, the metadata for a frame returned to the server device comprises a plurality of timestamps, each timestamp corresponding to a time that indicates the completion of processing for the frame by a particular stage or component of a stage. In some embodiments, the client device is configured to collect metadata for a plurality of frames (e.g., 60 seconds of video at 30-60 frames per second) in a data structure (e.g., a file) before transmitting the data structure to the server device. In such embodiments, the server device collects files for a number of sessions, each session amounting to, e.g., a number of seconds of video. It will be appreciated that the size of a session can be adjusted to match a desired size of the collected metadata, such as by collecting 30 minutes to 60 minutes worth of metadata in a session. In some embodiments, the client device collects the metadata in a circular buffer such that the metadata collected for the session is only the metadata for the last n frames in the session. For example, a circular buffer having a size suitable for collecting 10 minutes of data at 60 frames per second (e.g., 36,000 frames worth of metadata) can continuously collect metadata during a session, overwriting the oldest metadata as the session extends past 10 minutes in length. At the end of the session (e.g., when a game application is terminated), the client device can encode and transmit the contents of the circular buffer to the server device. It will be appreciated that, when a user experiences issues that degrade the user experience, the session will likely be terminated early and, as such, the last m minutes of a session (corresponding to n frames) are usually sufficient to highlight the cause of the issue that degraded the user experience. In other embodiments, the circular buffer can exist in the server side of the pipeline. The client device can be configured to send metadata for each frame back to the server device, which is then stored in the circular buffer. At the end of the session, the server device can process the contents of the circular buffer. In yet other embodiments, the metadata added by each stage of the pipeline can be stripped by the server device and stored temporarily at the server device such that the metadata is not forwarded to the client device along with the content. The stages of the pipeline at the client device then generate new metadata as the content is processed on the client side of the pipeline and the metadata is encoded and transmitted to the server device when the content is done being processed at the client device. The metadata from the client device is then combined with the corresponding metadata from the server device and stored in the circular buffer at the server device. It will be appreciated that any technique for collecting metadata at the server device, including having each stage transmit the corresponding metadata for that stage back to the server device individually, is within the scope of the present disclosure.

In an embodiment, the development of a quality metric relies on three different objective measurements. The first measurement relates to picture quality, which is based on a target bit rate of the video stream. A parameter "bits per pixel" can be calculated by dividing a target bit rate (e.g., bits per second) by a product of a height of the frame in pixels, a width of the frame in pixels, and a frame rate (e.g., frames per second). In other embodiments, the picture quality can be based on other objective measurements such as a resolution and a quantization parameter of the encoded frame.

The second measurement includes two components related to latency. The first component is related to a round trip delay (RTD) and the second component is related to a stack latency. The RTD measures the delay across the network and includes the delay from the server to the client and the delay from the client to the server. In an embodiment, a first timestamp (e.g., a timestamp appended to the metadata at the completion of the network stage 150) of the client device clock is captured when the frame (e.g., a data packet for the frame) is received from the server device, and a second timestamp (e.g., a timestamp appended to the metadata at the completion of the presentation stage 180) of the client device clock is captured when the frame is presented by the client device (e.g., on a display attached to or included in the client device). A difference between the second timestamp and the first timestamp is added to a third timestamp appended to the frame metadata that represents a time associated with the server device clock (e.g., a time when the frame was transmitted to the client device at the end of the transmit stage 140), which is echoed back to the server device. The RTD can be calculated by sampling the server device clock when the metadata is received and subtracting the sum of the third time stamp with the difference between the second time stamp and the first time stamp. In other words, the RTD represents a round trip delay corresponding to network latency both to and from the server device, relative to a clock maintained in the server device, but excludes the processing delay at the client device (e.g., the difference between the first and second timestamps). The stack latency is a difference between a time when an input (e.g., keypress, mouse input, controller input, etc.) is captured on the client side to a time when the frame that incorporates that input is displayed on the client device. The stack latency may be commonly referred to as a measurement of lag. In an embodiment, the client device captures a timestamp corresponding with the capture of the input. Using a short-term history of the render rate for the application, it is possible to estimate the next frame that is generated by the application executed by the server in order to associate the timestamp corresponding to the input capture event at the client to a frame rendered by the server. The server then waits to receive a timestamp from the client that indicates a time when the client presented the frame to the user, and a difference between the timestamp associated with the input capture and the timestamp associated with frame presentation represents the stack latency. It will be appreciated that inputs are asynchronous with frame rendering and, therefore, not every frame will have a stack latency value.

In some embodiments, a forward fill technique can be used to replace any value for a component that is determined to be a special not a number (NaN) value. For example, not every frame may be associated with an input and, therefore, only certain frames may have a corresponding stack latency value. Other frames may simply fill this value with a special NaN value. In practice, the stack latency component for one frame is likely to be the same for a next frame such that, as dictated by the perception of the user, the last good component value for a previous frame is forward filled for a sequence of subsequent frames until such point that the metadata allows for a new valid component value to be calculated for a subsequent frame. This forward fill technique is useful for ensuring that each and every frame in the streaming session is associated with a valid value, even if the metadata for that frame is unavailable. For example, remote input can be sampled at the client device at 1000 Hz, which could cause memory storage overflow issues if timestamps are stored at such a high sampling rate. In some embodiments, the sampling rate for monitoring remote input can be lower (e.g., 10 Hz or 100 ms per sample) for generating timestamps in order to reduce overloading the storage. Because multiple frames can correspond to the 100 ms window for a single timestamp instance related to remote input, the timestamps within the window can be forward filled to each frame within the window. This concept can be applied to any metadata (e.g., timestamps) that are generated asynchronously from the frame rate of the content.

In some embodiments, certain frames may be dropped by the pipeline. For example, a frame that arrives at the client device before the client device has displayed a previous frame may cause the client device to drop the previous frame and present the most recent frame at the next frame presentation period instead. In such cases, any component that relies on the timestamp for frame presentation, which may not exist in the metadata for the dropped frame, can be forward filled using the technique discussed above. In some cases, frames can be dropped at the server device too, such as when multiple frames are rendered in the memory when the frame capture stage 110 is ready to read in a new frame from the gaming application. Forward filling the raw values of components can be useful to complete sparse metadata.

The third measurement includes two components related to stutter. The first component is related to stutter by the gaming application and can be referred to as stutter related to Frame Capture. In other words, the first component is a measure of how often the server device fails to render a frame on time based on the expected frame rate. In one embodiment, stutter refers to a latency above a threshold value. For example, if a frame is expected to be rendered every 16.6 ms (corresponding to 60 frames per second), then a stutter can be defined whenever a frame is rendered at least 24 ms after the previous frame as calculated as a difference in timestamps associated with the completion of rendering of the current frame and a previous frame. The second component is related to stutter at the presentation stage of the pipeline and can be referred to as stutter related to Frame Presentation. In other words, the second component is a measure of how often the client device fails to present a new frame at the expected frame transition time. It will be appreciated that, when the client fails to receive a frame by the next presentation period, a previous frame may be displayed again during the next presentation period, causing a potentially noticeable stutter where motion appears to halt for the viewer.

In an embodiment, a raw value for each of the components discussed above is calculated based on the metadata for each frame. The raw value is then converted using a transfer function that scales the raw value to a desired scale (e.g., 0-100). The transfer function does not have to be linear. The weights are also assigned based on a fixed function (dependent on the raw value), and the weights can correspond to a different scale (e.g., 1 to 10, 1 to 200, etc.). It will be appreciated that the transfer function and the weight function can be distinct for each component. For example, the transfer function for the stack latency component can be different from the transfer function for the Frame Capture stutter component.

A subjective rating of quality can depend on the frequency of events as much as the severity of events. For example, a single severe event such as a 3 second latency may be perceived to be better than frequently occurring 300 millisecond latency because a user may view the single event as only affecting a small portion of the session whereas more frequently occurring events can cause the user to view the entire session negatively. In order to address this dependence on quality with the frequency of events, each component is averaged within a sliding window such that the score for a component at any given frame depends on the scores for the component for a number of frames preceding that frame, which will more accurately reflect the overall experience of an individual that will remember a negative event for a period of time that will affect their perception of the session even after the event fades away.

In an embodiment, the raw values for each component are multiplied by corresponding weights, and a per-frame, rolling weighted mean is calculated for each component by averaging the weighted scores that fall within a sliding window. As the weighted scores within the sliding window change for each new frame, the rolling weighted mean is essentially a weighted moving average for a particular time period that corresponds to X number of frames within the sliding window.

The individual component rolling weighted mean values are then combined to calculate an aggregate per-frame value based on the plurality of components. In an embodiment, a combined weighted score is calculated as a sum of partial products for the plurality of components. The combined weighted score is a per-frame value based on the converted scores (e.g., the raw value processed by the transfer function) and weights from the plurality of components. The partial product for a particular component is calculated as a product of the weight and the lesser of (e.g., a minimum) the rolling weighted mean and the converted score. In other embodiments, the partial product is simply the product of the weight and the rolling weighted mean. It will be appreciated that the weight for a given frame is re-used when calculating the partial product for the component when computing the combined weighted score. By applying the weight to the rolling weighted mean, the emphasis of negative events during that particular frame can be highlighted even though the raw score for that component during that frame is initially muted by the sliding window calculation.

The combined weighted score is a per-frame value and, using a second sliding window, a rolling mean of the combined weighted score and a rolling standard deviation of the combined weighted score can be calculated. The rolling mean of the combined weighted score is essentially a moving average for a particular time period that corresponds to Y number of frames within the second sliding window, and the rolling standard deviation is essentially a measure of the variation of the combined weighted score within the particular time period. In one or more embodiments, both the rolling mean and the rolling standard deviation of the combined weighted score may be per-frame values.

A combined value for a quality metric can then be computed based on the rolling mean and the rolling standard deviation. In some embodiments, the quality metric, sometimes referred to as a Streaming Experience Score (SES), is a sum of a stutter-latency score and a picture quality score. In an embodiment, the quality metric can also be shifted and/or normalized to rank the experience on a set scale (e.g., 0 to 100). In one embodiment, the stutter-latency score is calculated by summing a base score and a score offset. A base score is calculated by generating a rolling mean of the combined weighted score and a rolling standard deviation of the combined weighted score using a first configuration (e.g., a first set of parameters) of the first and second sliding window. An exemplary configuration of the first and second sliding window is X=600 frames and Y=3600 frames (e.g., the second sliding window is larger than the first sliding window). A per-frame streaming experience stutter latency score is then calculated by taking a difference between the rolling mean of the combined weighted score and a product of a coefficient (Z) and the rolling standard deviation of the combined weighted score. In an exemplary configuration, Z is set to 6.0 to calculate the base score. The score offset is calculated in a similar manner to the base score but using a different configuration (e.g., a second set of parameters) for the first and second sliding window as well as the coefficient. An exemplary configuration of the first and second sliding window is X=3600 frames and Y=600 frames (e.g., the first sliding window is larger than the second sliding window), and Z is set to 4.0 to calculate the score offset.

It will be appreciated that the base score and score offset may be calculated per frame. However, in some embodiments, the stutter-latency score may be a per-session, aggregate value. As such, the stutter-latency score can be calculated as a difference between an aggregate weighted mean of the (per-frame) base score and a standard deviation of the score offset, where the weights for the aggregate weighted mean are derived from remote input frequencies. As used herein, remote input frequencies refers to a measurement of a percentage of time corresponding to an active input (e.g., keypress events, mouse events, controller button or joystick events, etc.).

In an embodiment, the picture quality score is derived using a separate algorithm than the algorithm described above for the stutter and latency components. In such embodiments, the picture quality score is calculated based on a raw score for the picture quality, which is a per-session value that is related to a target bits per pixel bitrate of the video stream. In some cases, the target bitrate can change dynamically during the streaming session. In such cases, the picture quality score can be calculated as a mean of the target bitrate during the session (e.g., by summing the target bitrate for each frame and then dividing by the number of frames).

The quality metric is then calculated by summing the picture quality score and the stutter-latency score. The raw quality metric score can then be normalized and shifted, such that the score falls in a desired range (e.g., 0-100) that is easily evaluated by an administrator or developer.

It will be appreciated that changes to the streaming service such as adjusting encoding/decoding parameters, or adjusting a target bitrate or resolution of the video content, can be quickly evaluated to determine the effect that the change is likely to have on end-users. Similarly, the pipeline can be configured to automatically adjust parameters to attempt to improve the quality metric score. For example, in the case where a new video game is added to be delivered by the streaming service, the pipeline can automatically be configured to adjust the parameters of various stages of the pipeline to attempt to improve the quality of the streaming service to accommodate the new rendering portion of the pipeline. For example, the new game may require longer rendering times such that attempting to stream 60 frames per second causes severe stuttering. As the quality metric decreases for the streaming sessions associated with the new game, the server device can decrease the frame rate from 60 fps to 30 fps. Alternatively, a quantization parameter of the encoder can be changed to attempt to decrease the target bitrate of the video stream such that network bandwidth is reduced. Administrators or developers can also view graphs of the quality metric for a number of streams and make decisions for how to adjust the pipeline manually (e.g., by increasing the number of clusters available to process certain stages of the pipeline, or the like).

Figure 2:
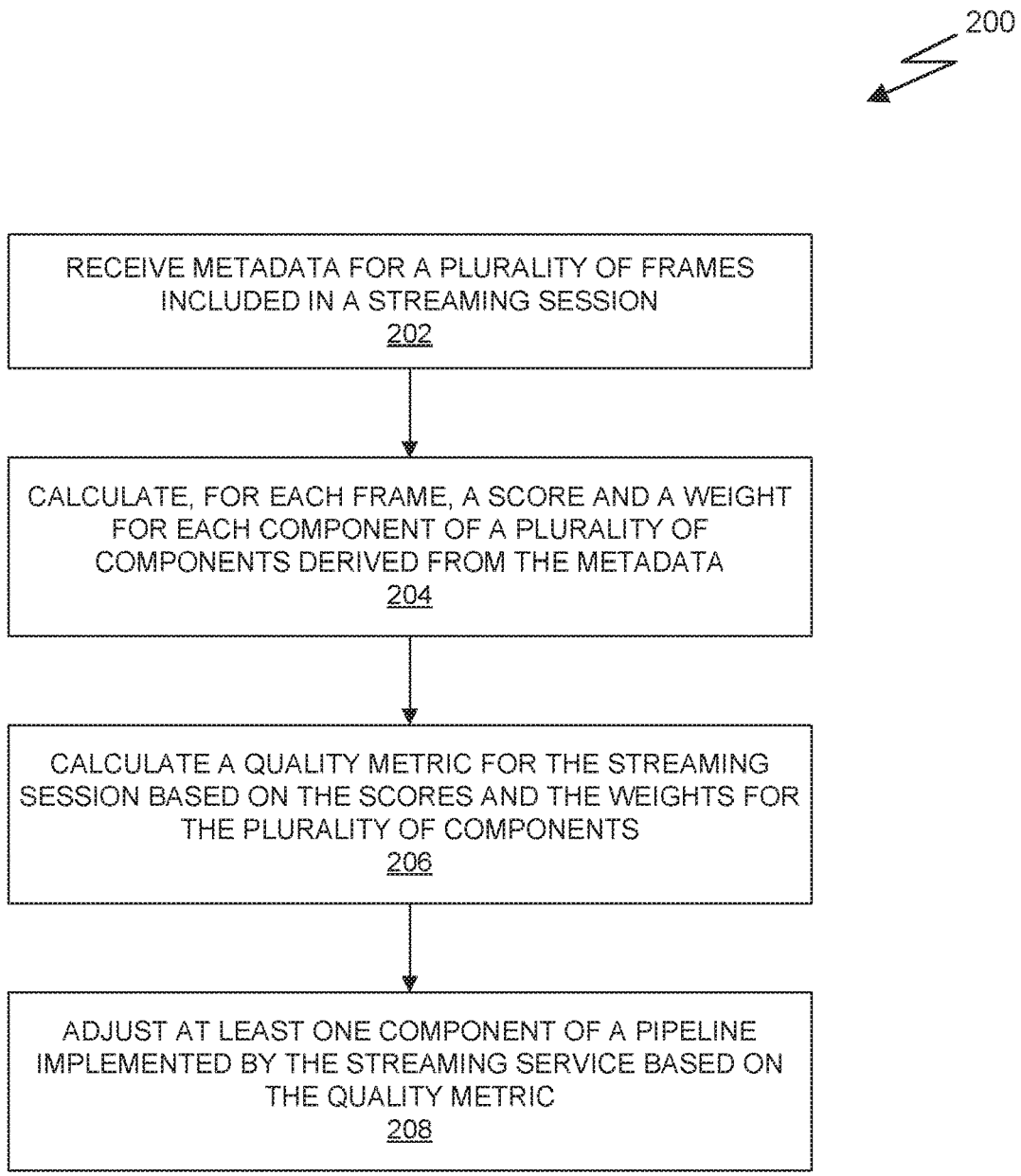
FIG. 2 illustrates a flowchart of a method for estimating a quality metric for the session, in accordance with some embodiments.

FIG. 2 illustrates a flowchart of a method 200 for estimating a quality metric for the session, in accordance with some embodiments. The method 200 is described in the context of software executed by one or more processors. In some embodiments, the method 200, at least in part, can be performed by instructions executed by a server device. In other embodiments, the method 200 can be performed by hardware or some combination of hardware and software.

At step 202, metadata for a streaming session is received at a server device. The metadata includes information for a plurality of frames included in a streaming session. The information can include a number of timestamps that indicate completion of processing at a number of points in the pipeline, such as at the completion of each stage in the pipeline.

At step 204, a score and a weight are calculated for each component of a plurality of components derived from the metadata. The score and weight are calculated for each frame of a plurality of frames included in the streaming session. In some embodiments, the score is derived from a raw value applied to a transfer function that converts the raw value to a score. The raw value can be calculated as a delta value that is a difference between a timestamp for the current frame and a corresponding timestamp for a previous frame. In some embodiments, the raw value is shifted by an expected latency based on a frame rate such that the raw value is either positive or negative. In some embodiments, the weight is derived from a function that is dependent on the raw value.

At step 206, a quality metric is calculated for the streaming session based on the scores and the weights for the plurality of components. In some embodiments, the quality metric is calculated as a sum of a picture quality score and a combined stutter latency score. The combined stutter latency score is calculated by: calculating, for each frame of the plurality of frames, a rolling weighted score for each component of at least one latency component and at least one stutter component based on a first sliding window; and calculating a rolling mean of a combined weighted sum of the rolling weighted scores for each of the at least one latency component and at least one stutter component, wherein the rolling mean of the combined weighted sum is based on a second sliding window. The picture quality score is calculated as a difference between a mean of a plurality of picture quality scores for the plurality of frames and a product of a coefficient and a standard deviation of the plurality of picture quality scores for the plurality of frames. In some embodiments, the quality metric is normalized and/or shifted.

At step 208, at least one component of a pipeline is adjusted based on the quality metric. The adjusting can include adjusting at least one of a quantization parameter, a target bit rate, an encoding parameter, or a target resolution for the frames generated by the pipeline. In some embodiments, a parameter such as a quantization parameter is adjusted when the quality metric for one or more streaming sessions is below a threshold value. For example, an average of the quality metrics for a number of sessions can be calculated and compared to a threshold value to determine whether to adjust a parameter. In some embodiment, a component of the pipeline can also be adjusted if the quality metric for one or more streaming sessions is above a threshold value. For example, if the quality metric is very high (i.e., indicating high user satisfaction) then certain parameters can be adjusted to, e.g., increase resolution, bitrate, frame rate, or the like of the streaming session while trying to avoid a negative impact on perceived quality due to, e.g., stutter or latency caused by network congestion.

It will be appreciated that the stages of the pipeline stack 100 and/or the steps of the method 200 are implemented by at least one of: one or more server devices, one or more network devices, and/or a client device. Each of a server device, a network device, and a client device includes at least a processor, a memory, and a network interface. The processor can include a conventional programmable processor such as a central processing unit. Alternatively, the processor can include a reduced instruction set computer (RISC) such as an ARM processor or a system on a chip (SoC) that includes one or more CPU cores and one or more GPU cores on a single integrated circuit or a plurality of integrated circuits included in a package on package (PoP) device. In some embodiments, especially for stages tasked with performing frame rendering operations or other types of operations that can benefit from a parallel architecture such as single instruction, multiple data (SIMD) or single instruction, multiple thread (SIMT) processor architectures, the processor can include a parallel processing unit (PPU) or tensor processor. In one or more other embodiments, the one or more server devices may be implemented at least partially, as an instantiation of a virtual machine using one or more virtual components that may include, without limitation, one or more of a virtual CPU, virtual GPU, and virtual memory.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 3:
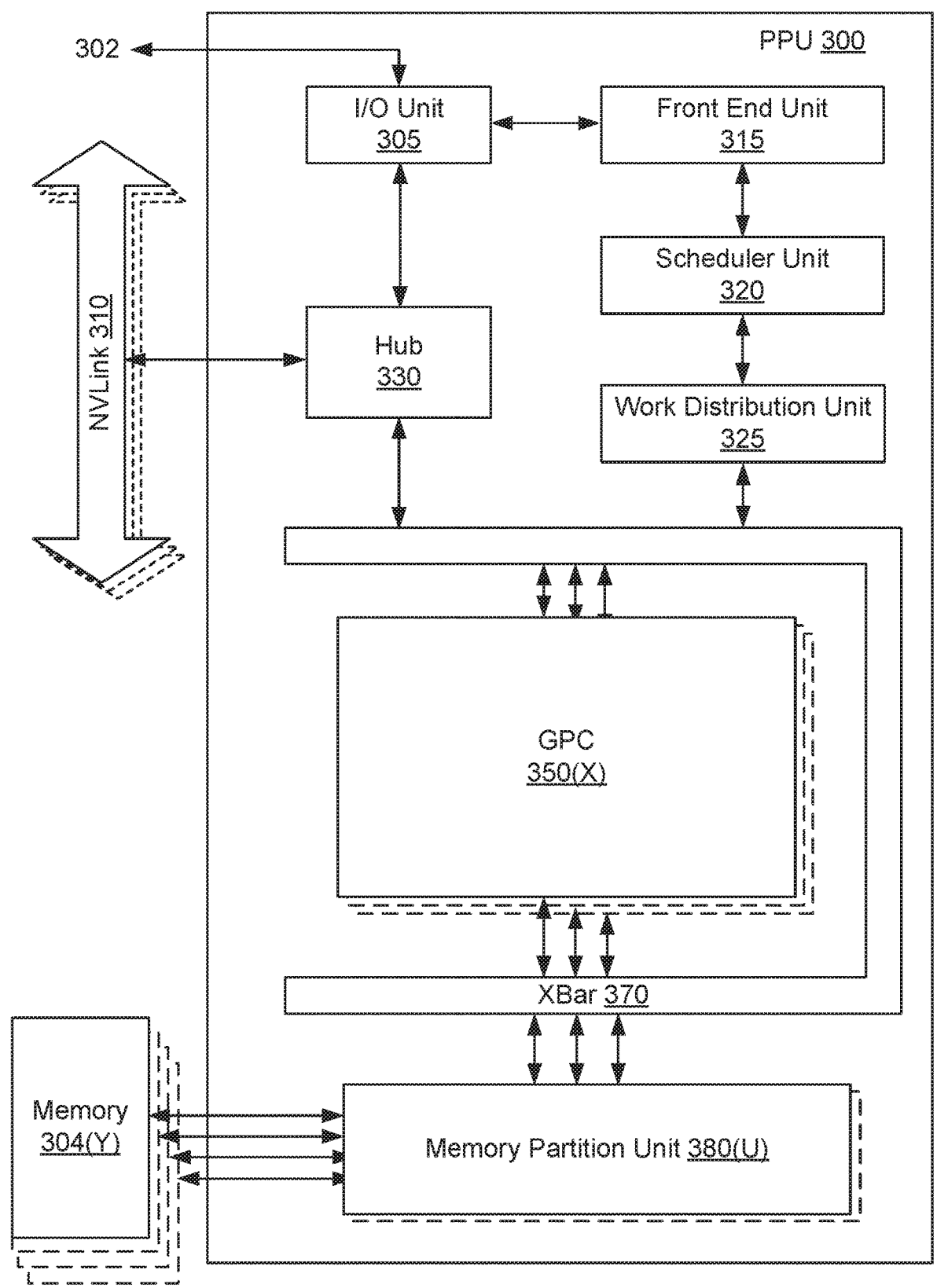
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, other simulation platforms for testing, verifying, or validating autonomous vehicle robotics applications involving ray-tracing techniques as described herein, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
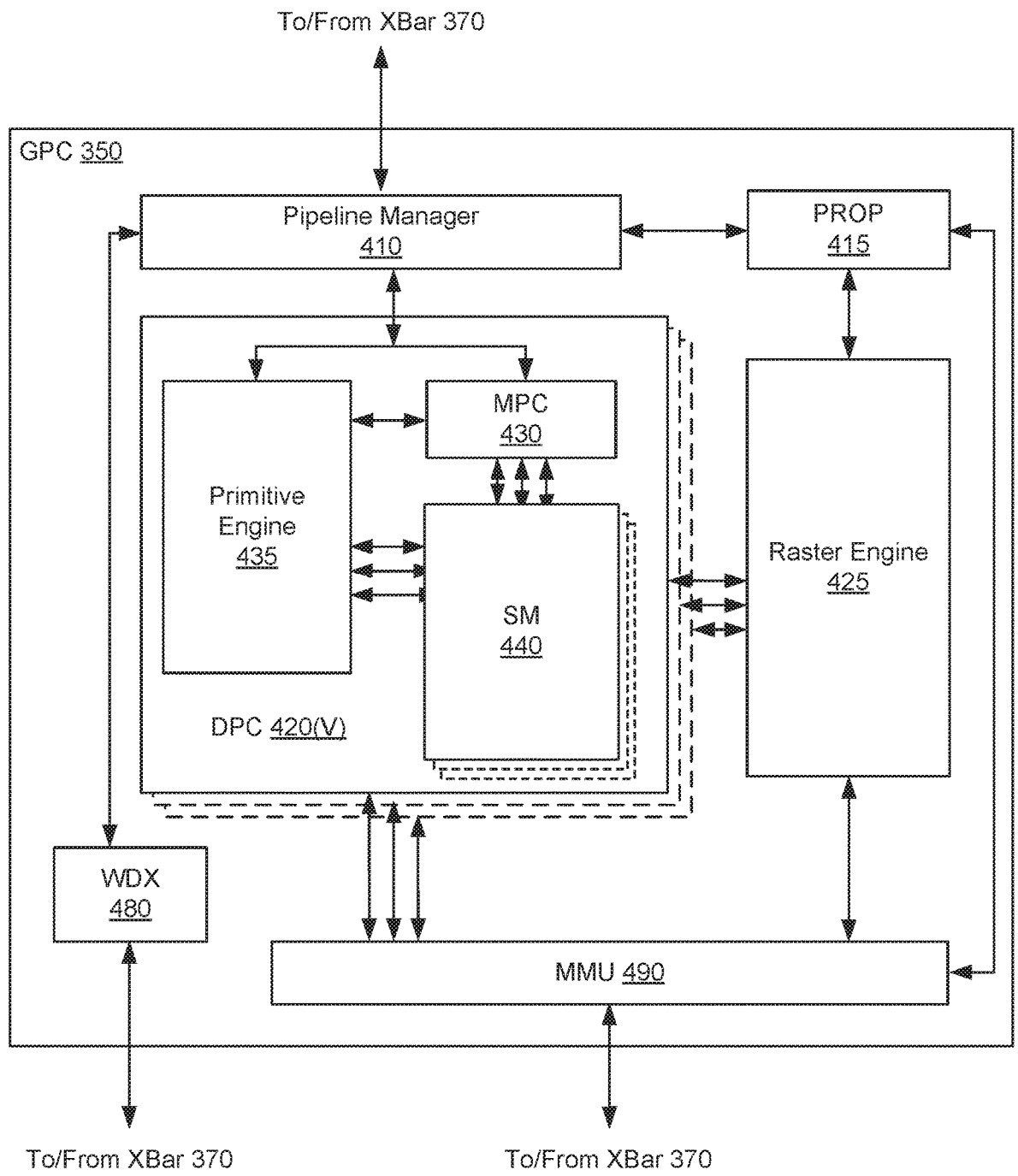
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
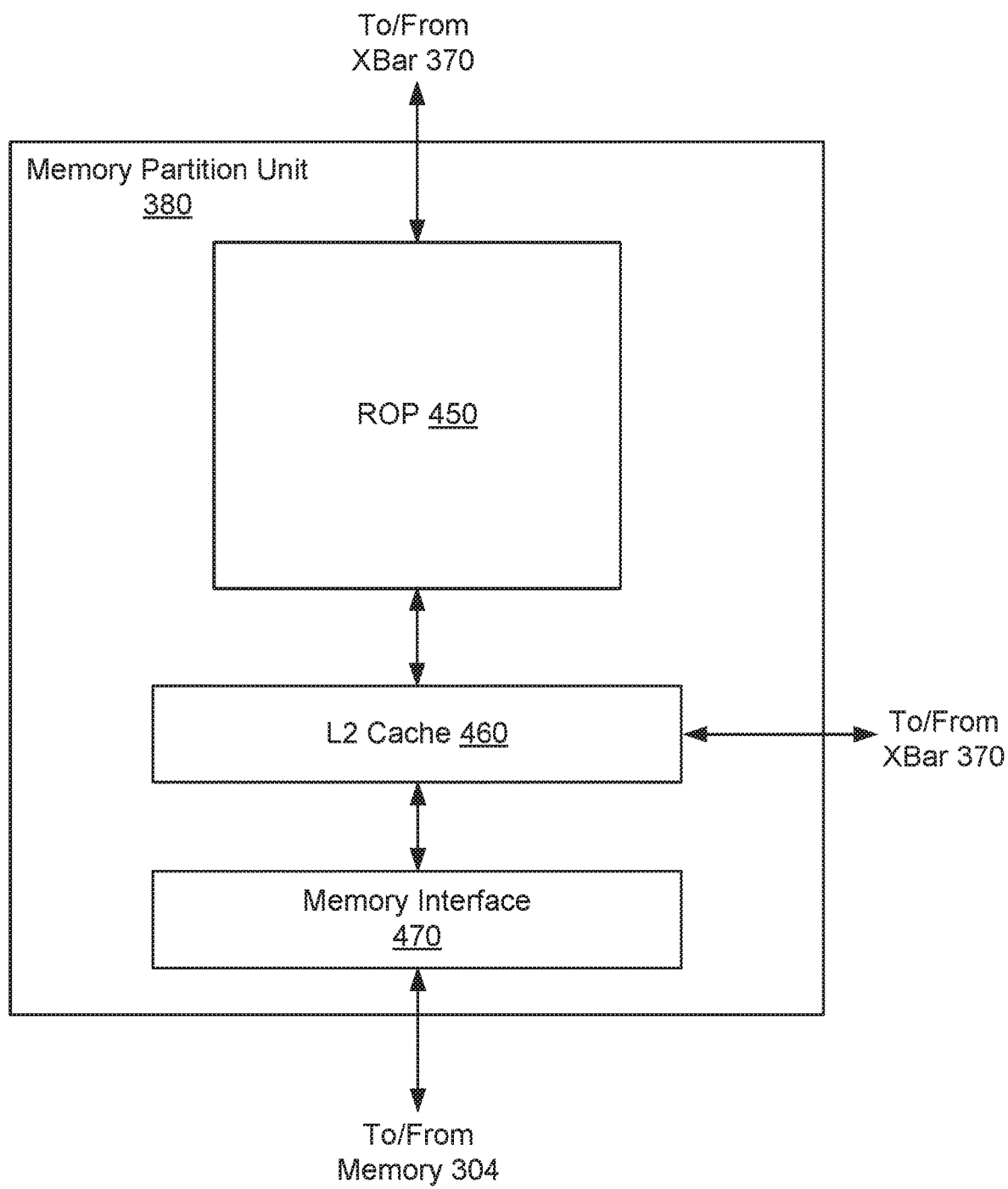
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
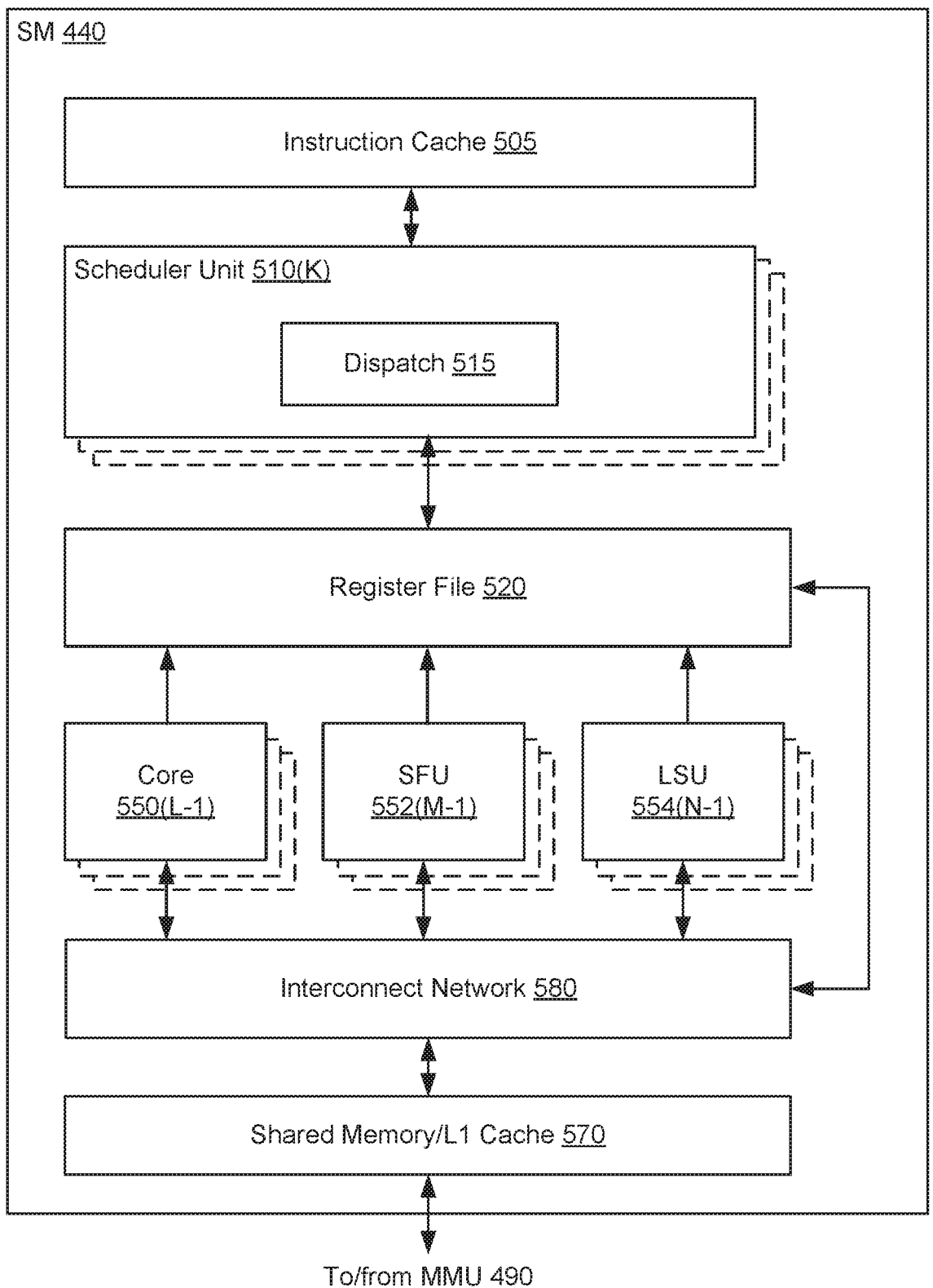
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture units configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a virtual machine (VM) or other shared computing resource, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
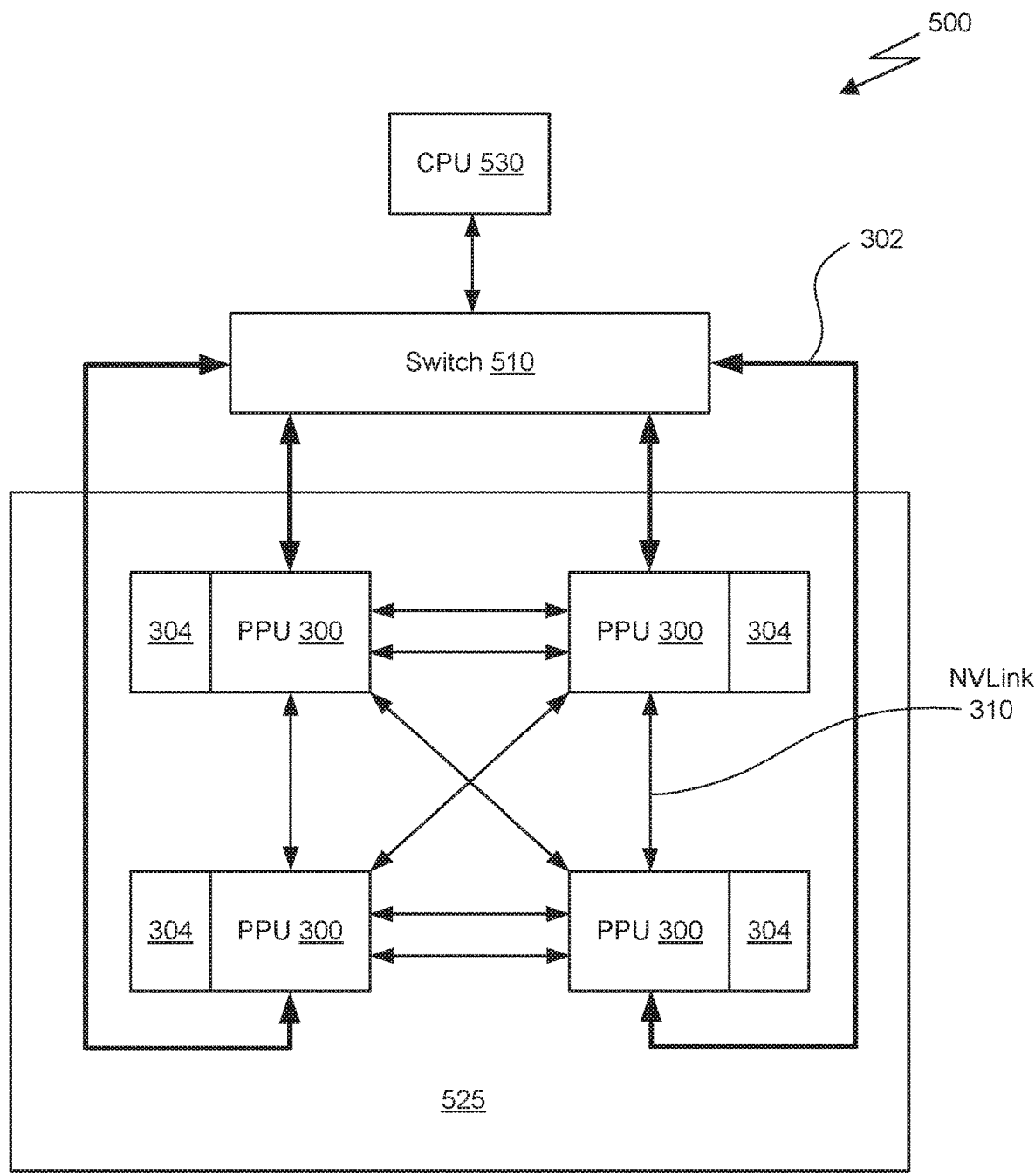
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
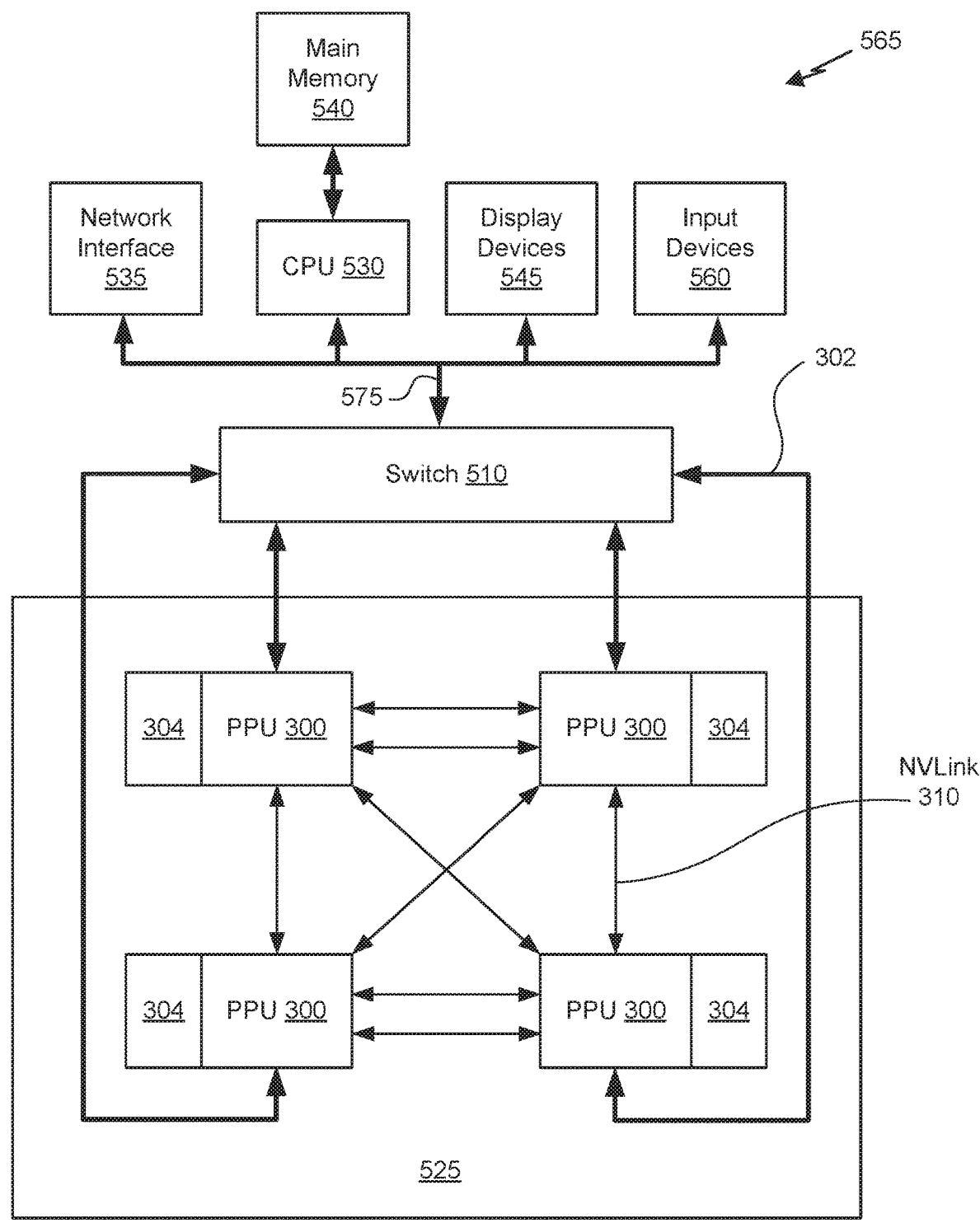
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternatively, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
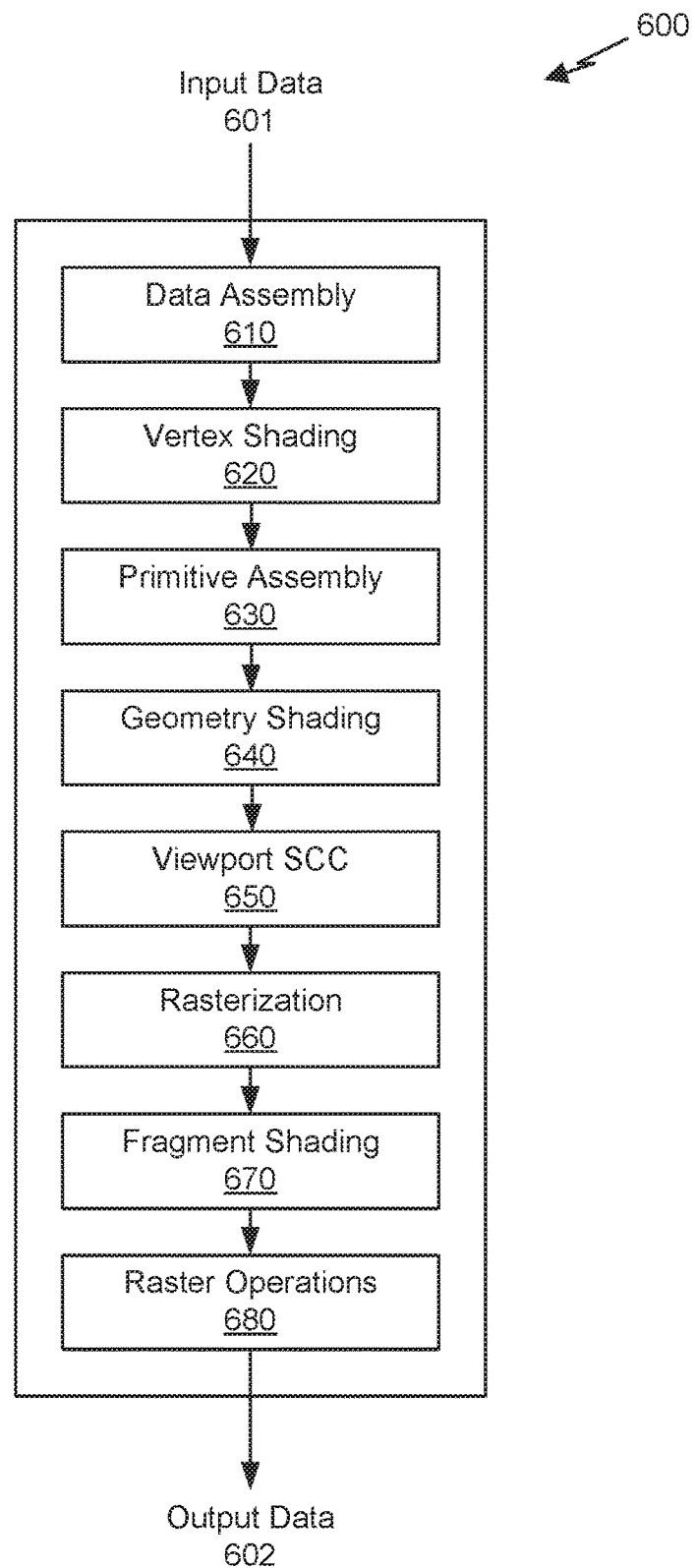
FIG. 6A is a conceptual diagram of a graphics processing pipeline implemented by the PPU of FIG. 3, in accordance with an embodiment.

FIG. 6A is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Rendering Via Ray-Tracing

Although rendering tasks are commonly implemented using raster-based rendering techniques, some algorithms for performing rendering utilize light transport simulation referred to as ray-tracing. Ray-tracing algorithms simulate the interaction of light with virtual objects in a scene in order to calculate colors for pixels of an image. Rays are cast into the scene for each pixel of the image as defined by a viewport and a virtual camera position. Effects such as diffuse and specular reflection, refraction, absorption, and the like can be simulated at each interaction of a ray with a virtual object by casting new rays from the intersection point of the ray with the virtual object. As a ray interacts with a light source, the light path from the virtual camera to the light source can be traced to determine a color of light passing through the pixel corresponding to the ray. An aggregate color from a plurality of rays passing through the pixel can be calculated to generate a color for the pixel of the image.

In some embodiments, the PPU 300 can be utilized to render an image in accordance with various ray-tracing techniques. For example, ray casting can be implemented for a number of rays in parallel by executing a plurality of threads on one or more SMs 440. Each thread compares the parameters for a ray to a representation of the virtual objects in the scene to determine whether the ray intersects a virtual object. In some embodiments, the representation of the virtual objects comprises a bounding volume hierarchy, which is used to efficiently determine whether a ray intersects with any virtual objects in the scene. Rays determined to intersect a virtual object can generate one or more new rays corresponding to a second plurality of threads executed by the SMs 440 in order to simulate lighting effects. When a ray intersects a light source, then the chain of rays from the virtual camera to the light source is identified as a light path, and the color of the pixel can be calculated for the light path.

Ray-tracing algorithms can be used to produce realistic computer-generated images. Such algorithms have been utilized for producing animated feature films or television programs, simulated images for commercial applications (e.g., images included in brochures or catalogs), and the like. Although ray-tracing was traditionally too complex for real-time applications, advancements in processing capacity and the underlying algorithms has made real-time ray-tracing practical in some applications.

Game Streaming System

Figure 6B:
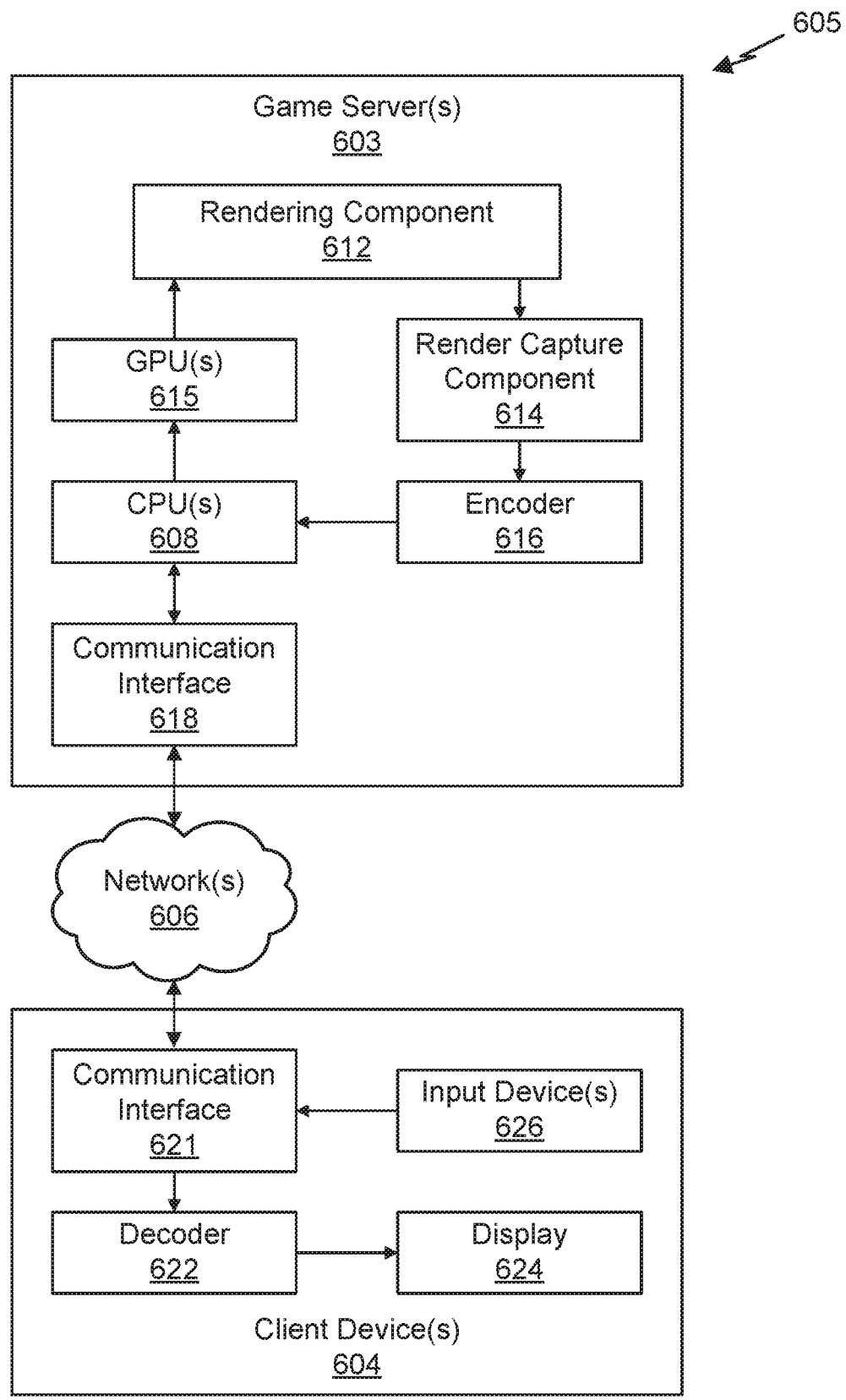
FIG. 6B is an example system diagram for a game streaming system, in accordance with some embodiments

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5B and/or exemplary system 565 of FIG. 5C), client device(s) 604 (which may include similar components, features, and/or functionality to the example processing system 500 of FIG. 5B and/or exemplary system 565 of FIG. 5C), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624. It will be appreciated that one or more stages of the pipelined stack 100 can be implemented by the game server(s) 603 and/or the client device 604.

Estimating Streaming Quality

Figure 7:
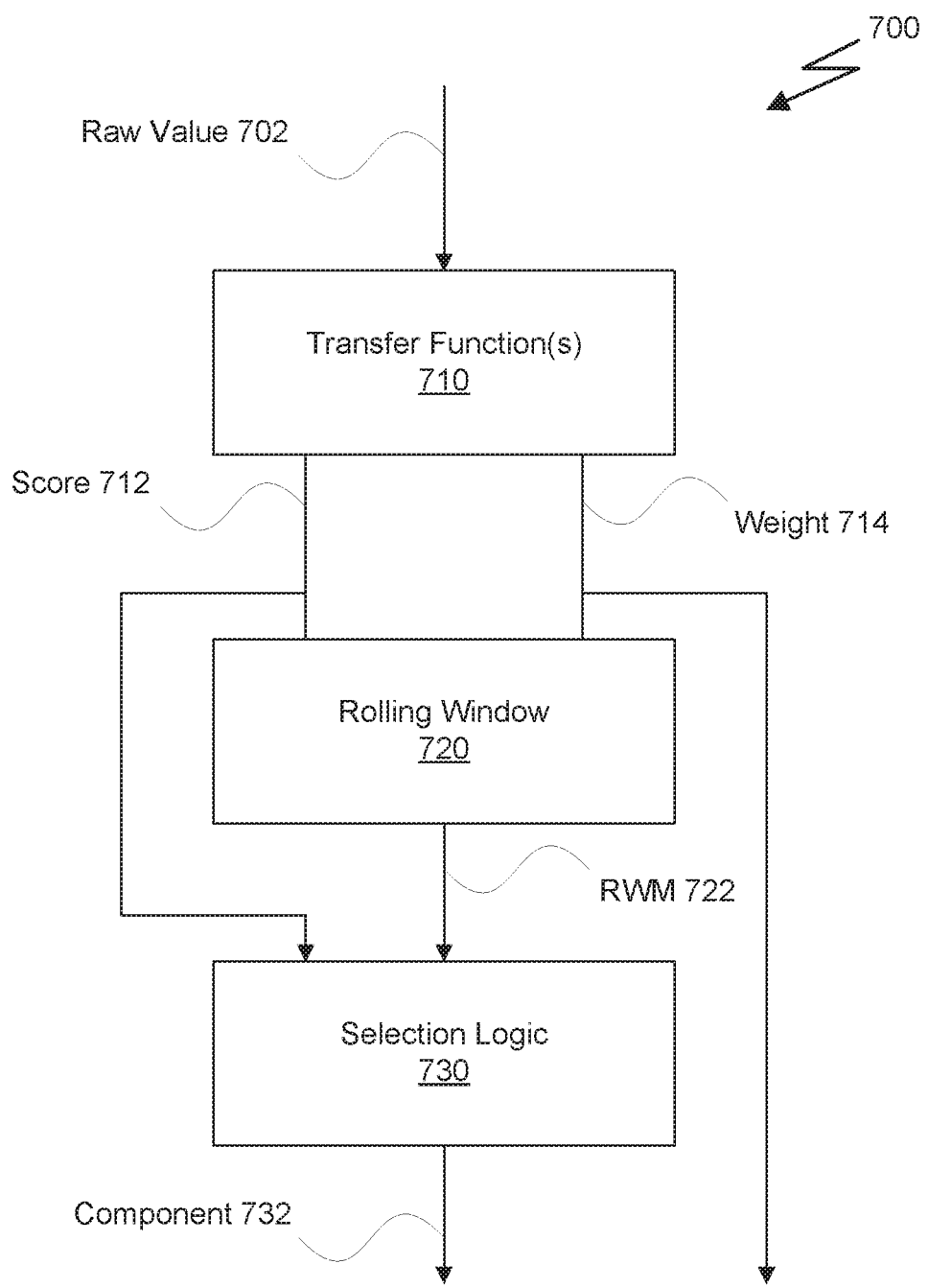
FIG. 7 illustrates logic for calculating a rolling weighted mean metric for a component derived from streaming session metadata, in accordance with some embodiments.

FIG. 7 illustrates logic for calculating a rolling weighted mean metric for a component derived from streaming session metadata, in accordance with some embodiments. As set forth above, the metadata for a streaming session includes various timestamps related to the different stages or components of the pipeline 100. A component score 732 and a weight 714 associated with the component score 732 can be generated by a module 700 configured to process the metadata. As used herein, the module 700 can be implemented in hardware, software, or a combination of hardware and software. In an embodiment, the module 700 is implemented in software executed by one or more processors of a server device. For example, the module 700 can be implemented as a set of instructions, stored in a memory, that is executed by the one or more processors.

In an embodiment, the raw value 702 comprises a delta that is calculated based on two or more timestamps read from the metadata. The raw value 702 is calculated for each frame of the streaming session, and the raw value 702 for a given frame can be derived based on timestamps associated with the frame as well as timestamps associated with one or more separate frames. For example, the components can include, but are not limited to, a capture delta, a presentation delta, a RTD, and a stack latency.

As depicted in FIG. 7, the per-frame raw values 702 for a particular component are received by the component module 700. In an embodiment, the raw values 702 are stored in an array, stored in a memory, that is generated using a processor configured to process the metadata for each frame in the streaming session to calculate the raw values 702. The processor generates two or more arrays corresponding to two or more components of the quality metric (e.g., one or more stutter component and one or more latency component).

Figure 8A:
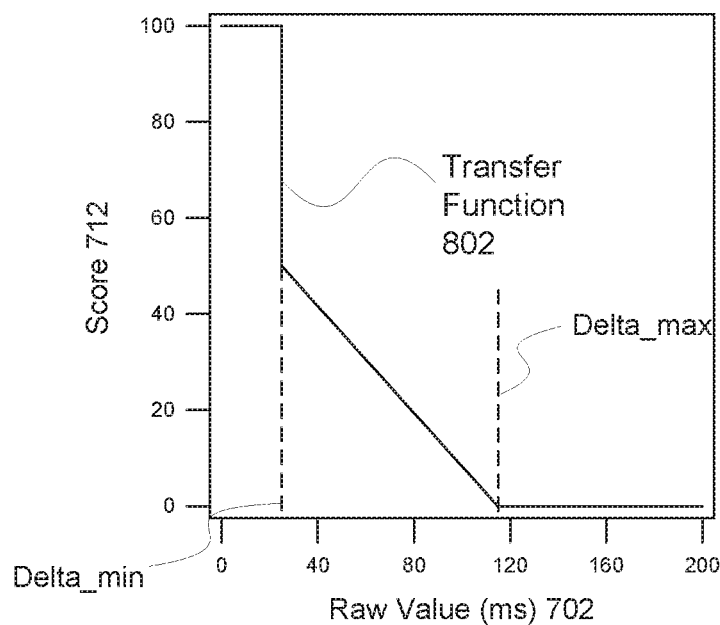
FIGS. 8A & 8B illustrate a pair of transfer functions for a stutter component of the quality metric, in accordance with some embodiments.
Figure 8B:
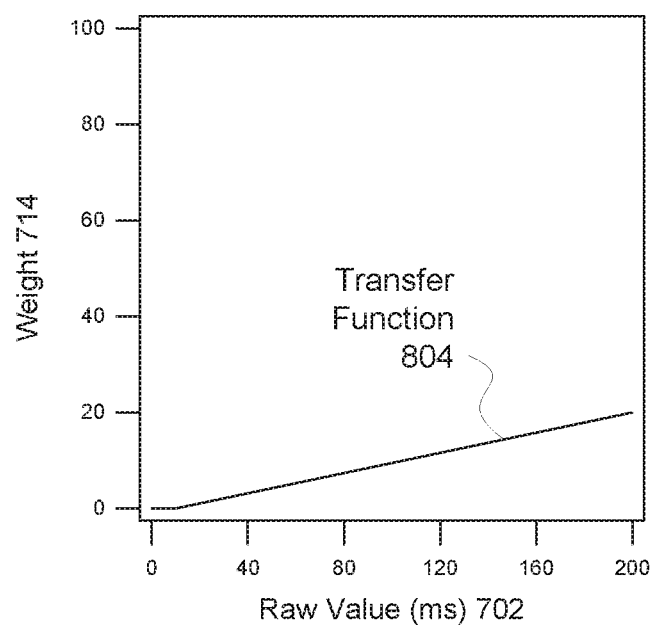

The raw values are then processed using a pair of transfer functions 710 to generate a score 712 and a weight 714. FIGS. 8A & 8B illustrate a pair of transfer functions for a stutter component of the quality metric, in accordance with some embodiments. The transfer functions are provided for illustrative purposes only and should not be construed as limiting the embodiments disclosed herein. The specific transfer functions implemented by an embodiment can be selected based on statistical analysis of a large number of streaming session metadata as well as accurately screened or filtered subjective quality metrics to maximize correlation between the objective quality metric and the subjective quality metrics.

As depicted in FIG. 8A, a transfer function 802 for the score of a stutter component of the quality metric, such as a first stutter component that can otherwise be referred to stutter related to Frame Presentation, is shown on a graph that maps the raw value 702, given in milliseconds, to a dimensionless score 712 in a specified range. In this case, the score 712 is mapped to a range between 0 and 100, although in other embodiments the range can be selected as a range of arbitrary values and can include negative values as well as positive values. Thus, for each raw value 702 of the stutter component associated with a frame of the streaming session, a score 712 is generated by mapping the raw value 702 to a corresponding value given by the transfer function.

The transfer function 802 shown in FIG. 8A can be described as follows. If the raw value 702 is less than a minimum threshold (referred to as Delta Min), then the score 712 is equal to the maximum score (e.g., 100). If the raw value 702 is greater than the minimum threshold, then the score 712 is equal to a difference between a maximum score in a linear region (e.g., Score_Linear_Max), which can be less than the maximum score (e.g., 50), and a ratio of the maximum score in the linear region and a difference between a maximum and a minimum value of the range of the linear region (e.g., a Delta_Max and a Delta Min) multiplied by a difference between the raw value 702 and Delta Min. The Delta_Max value can be set equal to a total delta (e.g., a difference between the calculated difference in timestamps and the expected frame rate) above which all raw values are assigned a score of 0, which in this example is set at 116 ms. The Delta Min can be set equal to a multiplier of the frame rate (e.g., 1.5*1000/{frames_per_second}).

As depicted in FIG. 8B, a second transfer function 804 for the weight of the stutter component of the quality metric is shown on a graph that maps the raw score 702 to a dimensional weight in a specified range. As shown herein, the weight 714 is also given on a scale between 0 and 100, although a different scale could be chosen for the weight transfer function (e.g., a scale between 0.0 and 1.0, 0 to 200, etc.).

Figure 9A:
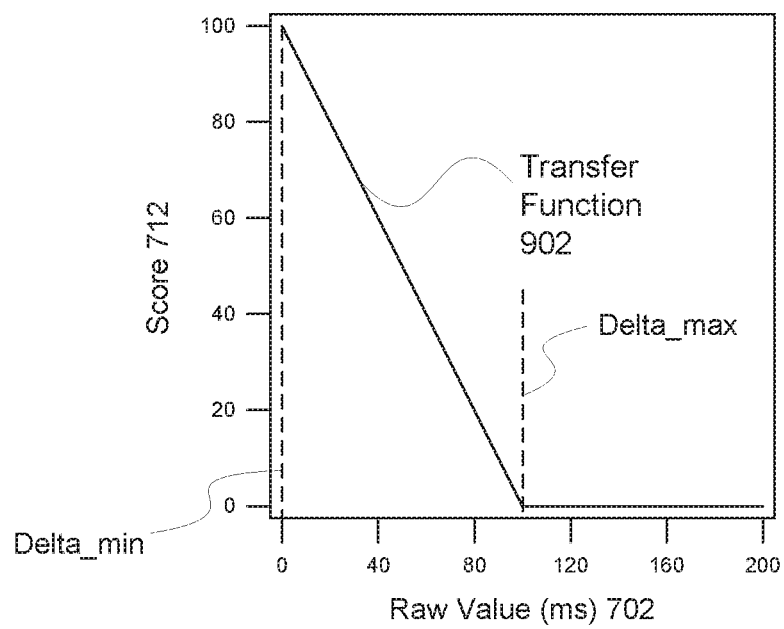
FIGS. 9A & 9B illustrate a pair of transfer functions for a latency component of the quality metric, in accordance with some embodiments.
Figure 9B:
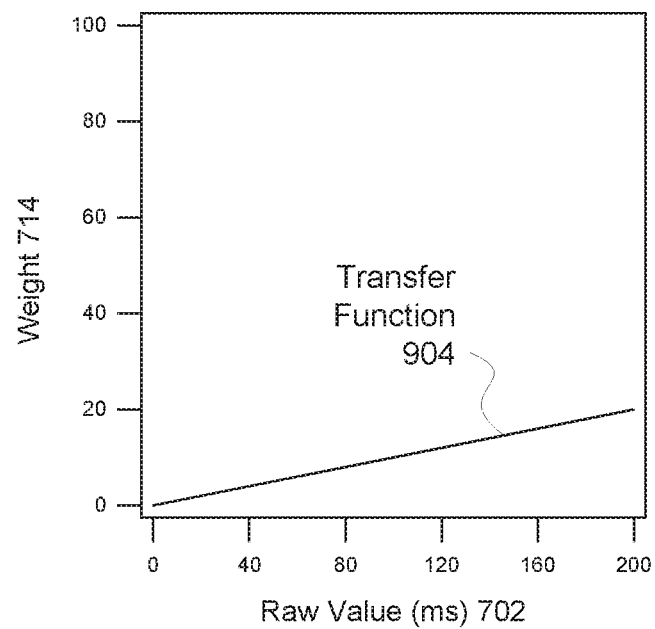

FIGS. 9A & 9B illustrate a pair of transfer functions for a latency component of the quality metric, in accordance with some embodiments. For example, the latency component can be a RTD. It will be appreciated that the transfer functions for the latency component are different than the transfer functions for the stutter component shown above. By enabling the use of different transfer functions, the raw delay values can be interpreted to have different scores and weights that reflect relative differences of the effect of various components on the final quality metric.

As depicted in FIG. 9A, a transfer function 902 for the score of a latency component of the quality metric is shown on a graph that maps the raw value 702, given in milliseconds, to a dimensionless score 712 in a specified range. The transfer function 902 maps the raw value 702 in a linear region between a Delta Min and a Delta_Max of 0 and 100, respectively, to a score 712. Above the Delta_Max, the score 712 is given as 0; otherwise, the score ranges between 100 and 0 in a linear fashion from Delta Min to Delta_Max. Although Delta Min, in this instance, is set equal to the minimum possible delta value (0 ms), in some embodiments, Delta Min can be set to a value of, e.g., 16-32 ms such that any raw value 702 below this threshold is considered to be equal to a maximum score.

As depicted in FIG. 9B, the transfer function 904 maps the raw value 702 to a weight 714 using a linear increasing function. In an embodiment, the weight is set equal to $\frac{1}{10}$ of the raw value up to a maximum threshold (e.g., 200). In some embodiments, the weight 714 can be set to a minimum value below a minimum threshold as well (e.g., weight is equal to 1.0 below a raw value of 10 ms).

It will be appreciated that different raw values 702 can be assigned the same score 712, but different weights 714, such that the contribution of the component to the quality metric is adjusted based on the combination of two different transfer functions and is not limited to a single transfer function. For example, a raw value of 200 ms and 1000 ms can both be considered so far out of the normal range that they are both assigned a score equal to a minimum score. However, by applying different weights, the raw value of 1000 ms may contribute more to the quality metric than the raw value of 200 ms.

Returning to FIG. 7, the scores 712 and corresponding weights 714 are provided to the sliding window unit 720, which applies a sliding window to calculate a rolling weighted mean of the scores 712 based on the corresponding weights 714. It will be appreciated that higher scores correspond to good performance and lower scores correspond to poor performance. In order to characterize a streaming session, there should be a way to aggregate the scores over time (e.g., aggregate scores over a number of frames included in the streaming session). One goal is to spread severe drops in score over multiple frames. For example, intuitively, a sudden but severe stutter will typically be perceived by a user as affecting more than a single frame that may have experienced the issue. The perception of the user is that a number of frames surrounding the poor frame are also poor, as the user doesn't fully recover from the event immediately when the next frame is correctly displayed. In other words, a negative experience will tend to contribute to our subjective perception that other experiences immediately following the negative experience are also more negative than they would be in isolation. Another goal is that more frequent but less severe drops in score should be weighed differently than isolated severe drops.

In an embodiment, the size of the sliding window is Xframes (e.g., X=30, 600, etc.). For each frame, the rolling weighted mean for the particular component is calculated by summing the weighted scores 712 for the current frame and X−1 previous frames included in the sliding window, with each score multiplied by the corresponding weight 714 prior to summation, and normalizing the weighted sum by the sum of the weights 714 within the sliding window to generate the rolling weighted mean (RWM) 722.

Finally, the final component quality score 732, which is a per-frame value, is calculated by selecting, via selection logic 730, the minimum of either the score 712 or the RWM 722 for each frame.

In some embodiments, the component module 700 can be configured to calculate multiple per-frame component scores 732 and corresponding weights 714, sequentially, for two or more different components, based on different transfer functions 710 for each component. In other embodiments, multiple component modules 700 can operate in parallel to calculate per-frame component scores 732 and corresponding weights 714 for two or more components in parallel.

Figure 10:
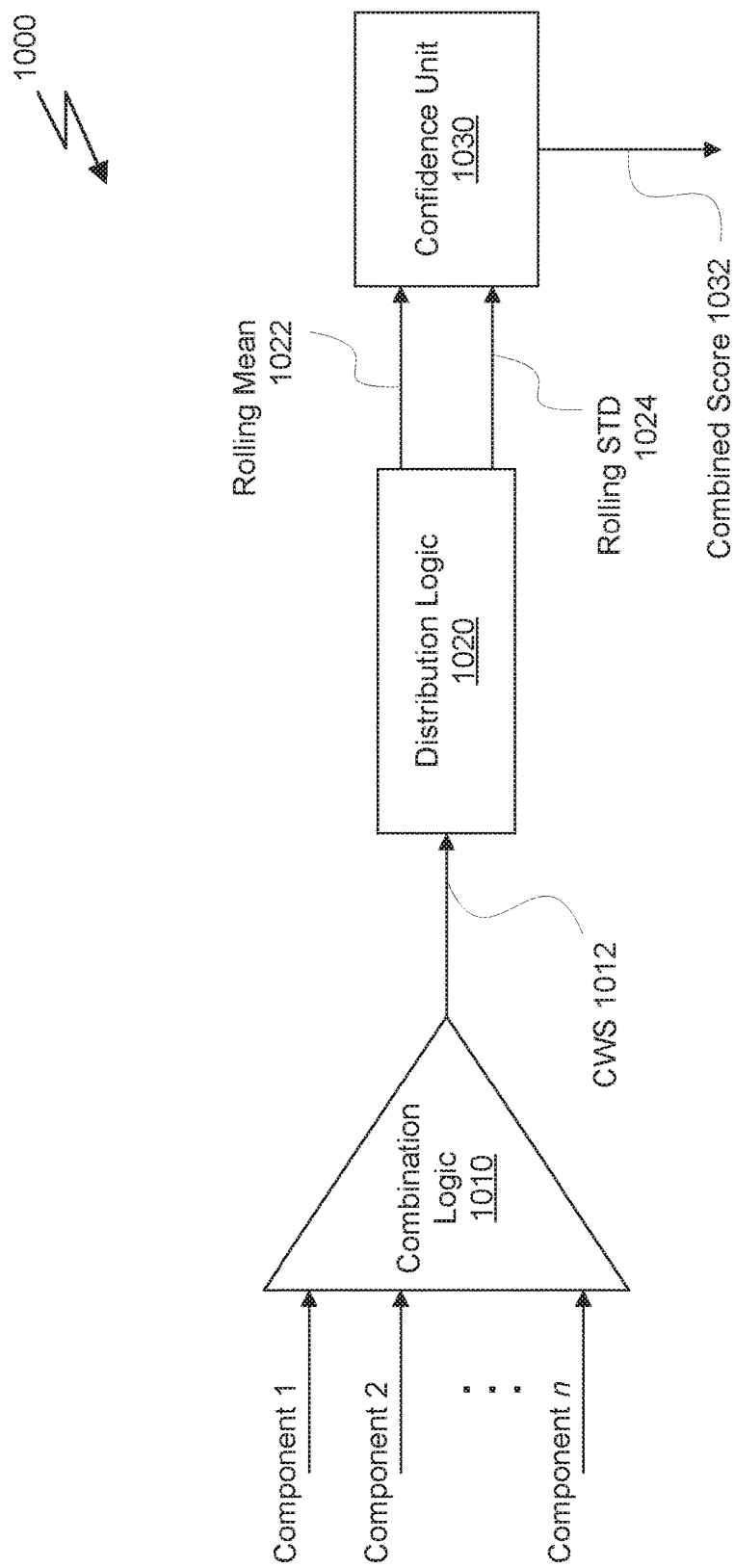
FIG. 10 illustrates logic for calculating a combined score representing a quality of the streaming session according to multiple per-frame component scores, in accordance with some embodiments.

FIG. 10 illustrates logic for calculating a combined score representing a quality of the streaming session according to multiple per-frame component scores, in accordance with some embodiments. Component data (e.g., per-frame component scores 732 and corresponding weights 714) for multiple components is received from one or more modules 700. The module 1000 processes the component data to generate a combined score 1032. In an embodiment, the combined score 1032 represents at least a portion of the quality metric for the streaming session based on stutter and latency components. As used herein, the module 1000 can be implemented in hardware, software, or a combination of hardware and software. In an embodiment, the module 1000 is implemented in software executed by one or more processors of a server device. For example, the module 1000 can be implemented as a set of instructions, stored in a memory, that is executed by the one or more processors.

In an embodiment, combination logic 1010 receives at least four sets of component data from module(s) 700. The component data can include, but is not limited to, component scores 732 and corresponding weights 714 for frame capture and presentation stutter as well as RTD and stack latency. The combination logic 1010 calculates a per-frame weighted mean (referred to as a combined weighted score (CWS) 1012) by summing partial products for each component, the partial products calculated by multiplying the component score 732 by a corresponding weight 714, and then normalizing the sum by dividing by a sum of the weights 714 across all components.

The CWS 1012 is a per-frame value based on component scores 732 for multiple components related to stutter and latency. It will be appreciated that stutter and latency components have been chosen for one implementation of the quality metric; however, in other embodiments, different components can be included in the quality metric in addition to or in lieu of the stutter/latency components disclosed herein.

The CWS 1012 is then processed by distribution logic 1020, which computes parameters of a distribution of the CWS 1012 values according to a second sliding window. In an embodiment, the size of the second sliding window is Y frames (e.g., Y=30, 600, etc.). It will be appreciated that the size of the second sliding window can be different from the size of the first sliding window implemented in the module 700. For each frame, a rolling mean 1022 and a rolling standard deviation (STD) 1024 for the CWS 1012 values within the second sliding window are calculated. The rolling mean 1022 is calculated by summing the CWS 1012 values and dividing by Y. The rolling STD 1024 is then calculated by taking the square root of the sum of squared differences between the CWS 1012 values and the rolling mean 1022.

In an embodiment, the rolling mean 1022 can be used as the combined score 1032. However, as shown in FIG. 10, in other embodiments, the rolling mean 1022 and rolling STD 1024 are processed by a confidence unit 1030 that is configured to subtract a multiple of the rolling STD 1024 from the rolling mean 1022 in order to produce the combined score 1032. In an embodiment, the multiple is 6.0 although other multiples (e.g., 1.5, 3.0, etc.) are contemplated as being used with lower confidence. It will be appreciated that the confidence unit 1030 acts to ensure that the combined score 1032 reflects a low range of the distribution of CWS 1012 values included in the sliding window such that most values (e.g., based on the multiple of STDs) in the distribution are above the combined score 1032, and is a way to adjust the average quality score within the second sliding window based on the variance of the computed quality score over a specified time period. Thus, for two different samples of CWS values 1012 within the sliding window, the combined score 1032 will be lower for the set of samples with higher variance, even when the two sets of samples have the same rolling mean 1022.

It will be appreciated that the combined scores 1032 are still computed as per-frame values, even though each combined score 1032 is a reflection of raw values 702 from the metadata for a number of frames in the neighborhood of the given frame, in accordance with both the first and second sliding windows implemented in the module 700 and the module 1000. While a chart of the combined scores 1032 over the course of the streaming session is useful to visualize how variable a particular streaming session was in terms of the objective quality, it is typically more useful to characterize a streaming session in terms of the overall session and not just on a frame-by-frame basis. Consequently, the stutter/latency combined scores can be combined with a per-session picture quality score in order to calculate a quality metric for the streaming session.

Figure 11:
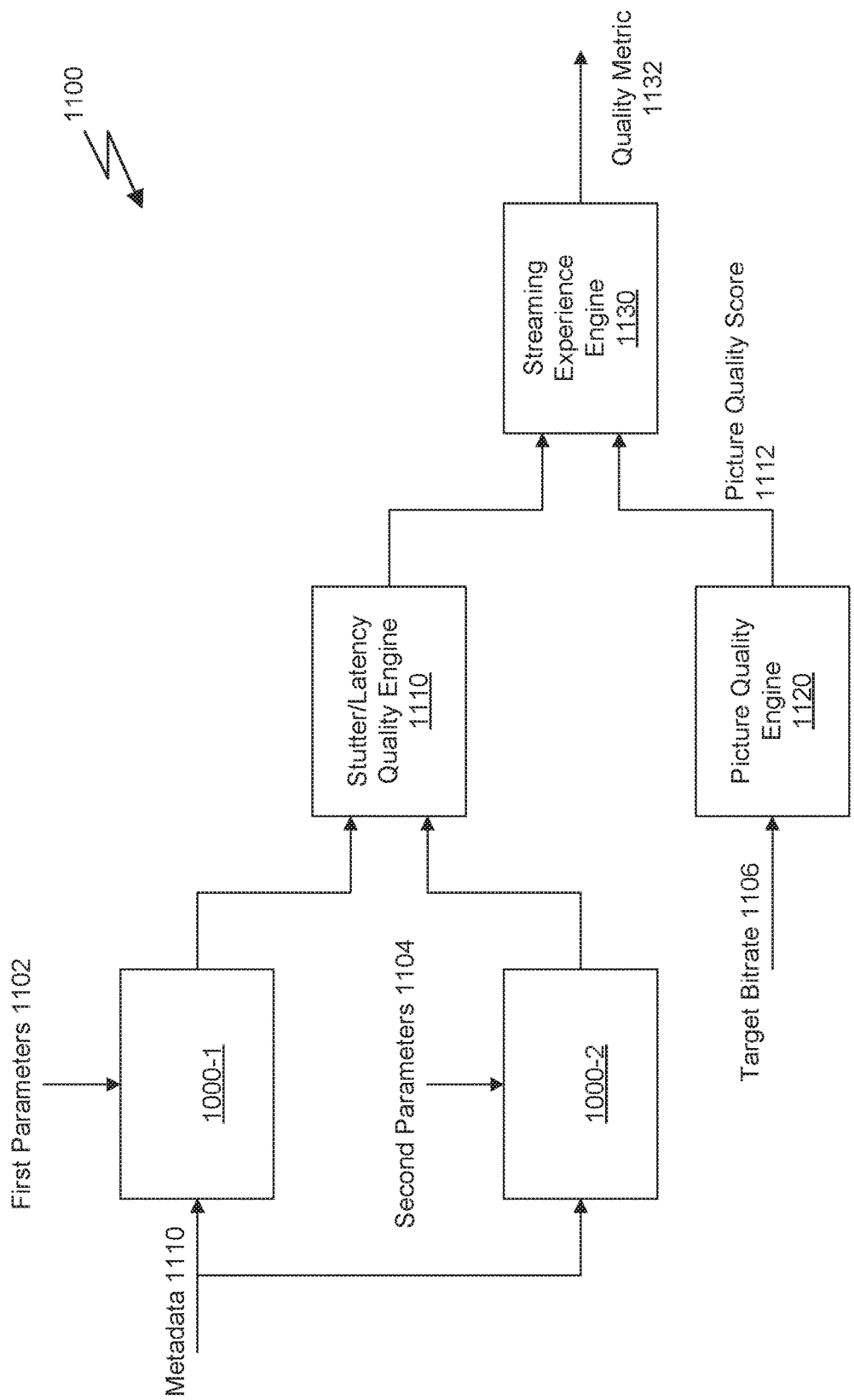
FIG. 11 illustrates logic to generate a quality metric for a streaming session, in accordance with some embodiments.

FIG. 11 illustrates logic to generate a quality metric for a streaming session, in accordance with some embodiments. As depicted in FIG. 11, the quality metric 1132 is based on the metadata 1110. In an embodiment, a streaming experience engine 1130 calculates the quality metric by combining both a picture quality component and a stutter/latency component. The stutter/latency component is generated by computing base scores using the module 1000 in accordance with two different sets of parameters. In a first instance of the module 1000-1, a first set of parameters 1002 configures the first sliding window to use a parameter of X=600 and the second sliding window to use a parameter of Y=3600, which corresponds to sliding windows of 10 seconds and one minute, at a frame rate of 60 Hz, respectively. In a second instance of the module 1000-2, a second set of parameters 1004 configures the first sliding window to use a parameter of X=3600 and the second sliding window to use a parameter of Y=600.

The stutter/latency quality engine 1110 then receives two sets of combined scores 1032, corresponding to the different sets of parameters. These per-frame combined scores are then aggregated to produce an aggregate mean and an aggregate standard deviation (STD). The combined scores 1032 from the first set of parameters 1102 are aggregated to generate the aggregate mean by calculating a weighted mean of the per-frame combined scores 1032, where the weights are selected based on remote input frequencies. Remote input frequencies refer to a measurement of how often the client device records inputs (e.g., key presses, mouse events, etc.), and, therefore, the aggregate mean is weighted based on the amount of input activity.

In one embodiment, a remote input signal is collected, by a client device, in accordance with a 10 Hz sampling rate. A sample of the remote input signal is active (e.g., 1 or logic high) if any input is received in the previous 100 ms, and, conversely, a sample of the remote input is inactive (e.g., 0 or logic low) if no input is received in the previous 100 ms. It will be appreciated that multiple frames can overlap a single remote input sample (e.g., due to a difference in sampling frequency and frame rate), and the weights for an inactive remote input signal can be non-zero so that the aggregate mean is not solely based on the base scores during active remote input.

In some embodiments, the weights can be based on a sliding window of the remote input signal. For example, a sliding window of 100 samples (e.g., 10 seconds) is used to calculate a frequency of the remote input signal in the sliding window. The remote input frequency is then a ratio of active samples to total samples in the sliding window, which in the example provided herein using 100 samples at a 10 Hz sampling frequency would be an integer value between 0 and 100. In one embodiment, the minimum weight is 1.0 such that even if no input is received in the previous 10 seconds, the weight is set to 1.0 instead of 0.0.

The aggregate mean provides a base score for the stutter/latency quality component. The base score is offset with a score offset value calculated as the aggregate STD of the combined scores 1032 based on the second set of parameters 1104. It will be appreciated that the aggregate STD is not simply the standard deviation of the combined scores 1032 used to compute the aggregate mean for the base score, because the aggregate STD is based on the combined scores 1032 generated using different parameters for the sliding window sizes. The aggregate STD is calculated by taking the square root of the sum of squared differences between the combined scores 1032 and the mean of the combined scores 1032, using the combined scores 1032 based on the second set of parameters 1104. The stutter/latency component of the quality metric is then generated by subtracting the score offset (e.g., the aggregate STD) from the base score (e.g., the aggregate mean).

Figure 12:
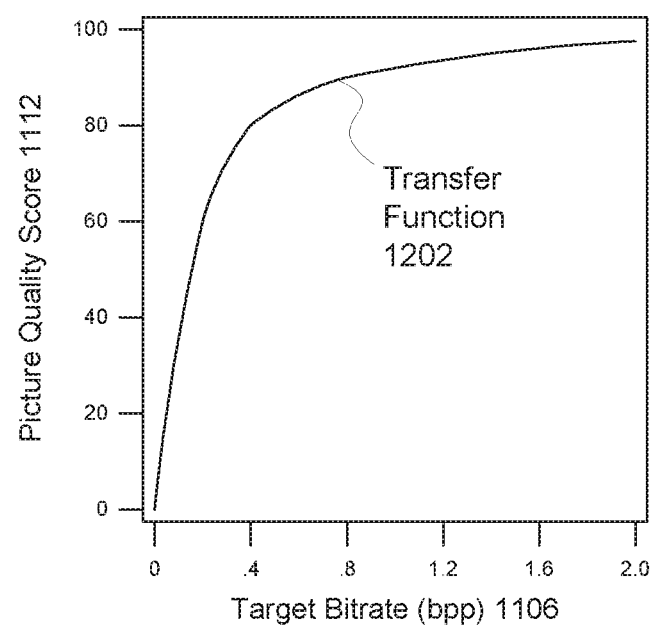
FIG. 12 illustrates a transfer function that maps a target bitrate to a picture quality score, in accordance with some embodiments.

The picture component of the quality metric is computed differently from the stutter/latency component because the raw value related to picture quality is not expected to change much during the streaming session. In a first embodiment, the picture quality score is simply derived by mapping a bits per pixel target bitrate of the streaming session, which is constant throughout the session, to a score value using a transfer function 1202. FIG. 12 illustrates a transfer function that maps a target bitrate (i.e., raw value 1106) to a picture quality score 1112, in accordance with some embodiments. The transfer function 1202 represents a curve fit to the following set of points:

TABLE 1

| bpp | Score |
|---|---|
| 0.016 | 0 |
| 0.04 | 7 |
| 0.08 | 20 |
| 0.121 | 38 |
| 0.161 | 50 |
| 0.201 | 61 |
| 0.241 | 70 |
| 0.281 | 75 |
| 0.322 | 80 |
| 0.402 | 85 |
| 0.643 | 94 |
| 0.965 | 97 |
| 1.608 | 100 |

The score can be limited to a maximum score of 100 (i.e., bpp beyond a maximum target bit rate of 1.608 are all set to a score of 100).

Returning now to FIG. 11, in some embodiments, the target bitrate can change occasionally during the course of the streaming session. For example, the network condition might be monitored by the server device (e.g., based on the returned metadata), and the server device can adjust the target bitrate to try and help improve the experience of the streaming session based on the network condition. In such embodiments, the target bitrate and, therefore, the score for picture quality is not constant over the entire streaming session. Consequently, the picture quality engine 1020 can be configured to calculate a base score and a score offset for the picture quality. The base score is generated by calculating a mean of the picture quality scores over the course of the session, and the score offset is generated by calculating a STD of the picture quality scores over the course of the session. The picture quality component of the quality metric is then computed by subtracting a multiple (e.g., 1.5, etc.) of the score offset from the base score.

Finally, the streaming experience engine calculates the quality metric 1132 by summing the picture quality component of the quality metric generated by the picture quality engine 1020 with the stutter/latency component of the quality metric generated by the stutter/latency quality engine 1010. In some embodiments, the quality metric 1032 is also shifted and/or normalized (e.g., by adding a base quality score of 50 to the unshifted quality metric or by multiplying the unshifted quality metric by 0.5 prior to shifting).

It will be appreciated that the techniques described above are not limited to streaming video games or VR/AR applications. Any content that requires a pipelined stack implemented in a client-server framework and requiring some type of client-side feedback is contemplated as being within the scope of the disclosure. For example, video teleconferencing applications and/or business productivity software streaming as a service are within the scope of the present disclosure.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for estimating a quality of a streaming session provided by a streaming service, the system comprising:
   one or more processors configured to:
   receive metadata for a plurality of frames included in the streaming session;
   calculate, for each frame of the plurality of frames, a score and a weight for each component of a plurality of components derived from the metadata;
   calculate a quality metric for the streaming session based on the scores and weights for the plurality of components; and
   adjust at least one component of a pipeline implemented by the streaming service based on the quality metric.

2. The system of claim 1, wherein the quality metric is calculated as a sum of a picture quality score and a combined stutter-latency score.

3. The system of claim 2, wherein the combined stutter-latency score is calculated by:
   calculating, for each frame of the plurality of frames, a rolling weighted score for each component of at least one latency component and at least one stutter component based on a first sliding window; and calculating a rolling mean of a combined weighted sum of the rolling weighted scores for each of the at least one latency component and at least one stutter component, wherein the rolling mean of the combined weighted sum is based on a second sliding window.

4. The system of claim 3, wherein the combined stutter-latency score is calculated as a difference between an aggregate weighted mean calculated based on a first set of parameters and a standard deviation based on a second set of parameters.

5. The system of claim 2, wherein the picture quality score is calculated as a difference between a mean of a plurality of picture quality scores for the plurality of frames and a product of a coefficient and a standard deviation of the plurality of picture quality scores for the plurality of frames.

6. The system of claim 1, wherein adjusting the at least one component of the pipeline implemented by the streaming service based on the quality metric comprises adjusting at least one of a quantization parameter, a target bit rate, and encoding parameter, or a target resolution for the frames generated by the pipeline.

7. The system of claim 1, wherein the one or more processors are further configured to generate a visual representation of the quality metric for the streaming session.

8. The system of claim 1, wherein the plurality of components include at least one of the following components:
- a first stutter component based on a delta between a first timestamp corresponding to rendering a frame by an application and a second timestamp corresponding to capturing the frame by a first stage of the pipeline;
- a second stutter component based on a delta between a first timestamp corresponding to presenting the frame on a client device and a second timestamp corresponding to presenting a previous frame on the client device;
- a first latency component based on a round trip delay for the frame; and
- a second latency component based on a stack latency for the frame.

9. A method for estimating a quality metric of a streaming session, the method comprising:
- receiving metadata for a plurality of frames included in the streaming session, wherein the metadata includes information related to a number of stages in a pipeline implemented by a streaming service, and wherein the pipeline includes at least one stage implemented by a server device and at least one additional stage implemented by a client device connected to the server device via a network;
- calculating, for each frame of the plurality of frames, a score and a weight for each component of a plurality of components derived from the metadata; and
- calculating a quality metric for the streaming session based on the scores and weights for the plurality of components.

10. The method of claim 9, further comprising:
- generating a visual representation of the quality metric for one or more streaming sessions; or
- adjusting at least one component of the pipeline based on the quality metric.

11. The method of claim 9, wherein the quality metric is calculated as a sum of a picture quality score and a combined stutter-latency score.

12. The method of claim 11, wherein the combined stutter-latency score is calculated by:
- calculating, for each frame of the plurality of frames, a rolling weighted score for each component of at least one latency component and at least one stutter component based on a first sliding window; and
- calculating a rolling mean of a combined weighted sum of the rolling weighted scores for each of the at least one latency component and at least one stutter component, wherein the rolling mean of the combined weighted sum is based on a second sliding window.

13. The method of claim 12, wherein the combined stutter-latency score is calculated as a difference between an aggregate weighted mean calculated based on a first set of parameters and a standard deviation based on a second set of parameters.

14. The method of claim 11, wherein the picture quality score is calculated as a difference between a mean of a plurality of picture quality scores for the plurality of frames and a product of a coefficient and a standard deviation of the plurality of picture quality scores for the plurality of frames.

15. The method of claim 9, further comprising adjusting, in response to the quality metric, at least one of a quantization parameter, a target bit rate, and encoding parameter, or a target resolution for the frames generated by the pipeline.

16. The method of claim 9, wherein the plurality of components include at least one of the following components:
- a first stutter component based on a delta between a first timestamp corresponding to rendering a frame by an application and a second timestamp corresponding to capturing the frame by a first stage of the pipeline;
- a second stutter component based on a delta between a first timestamp corresponding to presenting the frame on a client device and a second timestamp corresponding to presenting a previous frame on the client device;
- a first latency component based on a round trip delay for the frame; and
- a second latency component based on a stack latency for the frame.

17. A non-transitory computer-readable media storing computer instructions that, when executed by one or more processors, cause the one or more processors to perform steps comprising:
- receiving metadata for a plurality of frames included in the streaming session, wherein the metadata includes information related to a number of stages in a pipeline implemented by a streaming service, and wherein the pipeline includes at least one stage implemented by a server device and at least one additional stage implemented by a client device connected to the server device via a network;
- calculating, for each frame of the plurality of frames, a score and a weight for each component of a plurality of components derived from the metadata; and
- calculating a quality metric for the streaming session based on the scores and weights for the plurality of components.

18. The computer-readable medium of claim 17, the steps further comprising:
- generating a visual representation of the quality metric for one or more streaming sessions; or
- adjusting at least one component of the pipeline based on the quality metric.

19. The computer-readable medium of claim 17, wherein:
- the quality metric is calculated as a sum of a picture quality score and a combined stutter-latency score;
- the combined stutter-latency score is calculated by:

calculating, for each frame of the plurality of frames, a rolling weighted score for each component of at least one latency component and at least one stutter component based on a first sliding window; and calculating a rolling mean of a combined weighted sum of the rolling weighted scores for each of the at least one latency component and at least one stutter component, wherein the rolling mean of the combined weighted sum is based on a second sliding window; and the picture quality score is calculated as a difference between a mean of a plurality of picture quality scores for the plurality of frames and a product of a coefficient and a standard deviation of the plurality of picture quality scores for the plurality of frames.

20. The computer-readable medium of claim 19, wherein the combined stutter-latency score is calculated as a difference between an aggregate weighted mean calculated based on a first set of parameters and a standard deviation based on a second set of parameters.

\* \* \* \* \*